(12) United States Patent
Fukiage

(10) Patent No.: US 12,079,530 B2
(45) Date of Patent: Sep. 3, 2024

(54) PRINTING SYSTEM AND SERVER

(71) Applicant: SEIKO EPSON CORPORATION, Tokyo (JP)

(72) Inventor: Masaki Fukiage, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/055,927

(22) Filed: Nov. 16, 2022

(65) Prior Publication Data
US 2023/0153049 A1 May 18, 2023

(30) Foreign Application Priority Data

Nov. 16, 2021 (JP) .................................. 2021-186498

(51) Int. Cl.
*G06F 3/12* (2006.01)
*H04N 1/00* (2006.01)

(52) U.S. Cl.
CPC .......... *G06F 3/1288* (2013.01); *G06F 3/1204* (2013.01); *G06F 3/1208* (2013.01); *G06F 3/1242* (2013.01); *G06F 3/1265* (2013.01); *G06F 3/1268* (2013.01); *G06F 3/1273* (2013.01); *H04N 1/00244* (2013.01); *H04N 1/00403* (2013.01); *H04N 1/00488* (2013.01); *H04N 1/00973* (2013.01); *H04N 2201/0082* (2013.01)

(58) Field of Classification Search
CPC ..... G06F 3/1267; G06F 3/1273; G06F 3/1204
See application file for complete search history.

(56) References Cited

U.S. PATENT DOCUMENTS

| | | | | |
|---|---|---|---|---|
| 11,568,863 | B1* | 1/2023 | Sarikaya | G10L 15/02 |
| 2007/0076249 | A1* | 4/2007 | Emori | G06F 3/1273 |
| | | | | 358/1.15 |
| 2007/0097423 | A1* | 5/2007 | Kawano | G06F 3/1204 |
| | | | | 358/1.15 |
| 2015/0317109 | A1 | 11/2015 | Kirihata | |
| 2021/0104239 | A1* | 4/2021 | Miyazaki | G10L 15/22 |
| 2022/0092269 | A1* | 3/2022 | Le | G06F 40/35 |

FOREIGN PATENT DOCUMENTS

JP          2015213256 A     11/2015

\* cited by examiner

*Primary Examiner* — John R Wallace
(74) *Attorney, Agent, or Firm* — Pramod Chintalapoodi

(57) ABSTRACT

A server of a printing system includes a print instruction acquisition unit configured to acquire a print instruction indicated by a voice that is a print instruction of a content included in a content group from a voice intermediation device, a selection unit configured to select a content to be printed from the content group according to the print instruction, and a transmitter configured to transmit print data for printing the selected content to the printing device. The selection unit totalizes a printing count of each content included in the content group for a plurality of users, and selects the content to be printed from the content group based on the totalized printing count. The selection unit may select the content to be printed from the content group based on an attribute applicable to a user. The printing device receives the print data and performs printing according to the print data.

13 Claims, 14 Drawing Sheets

SELECTION PROBABILITY SR

| | BASIC | KIDS | CUTE |
|---|---|---|---|
| MALE REFERENCE | $\dfrac{300}{600}$ | $\dfrac{200}{600}$ | $\dfrac{100}{600}$ |
| FEMALE REFERENCE | $\dfrac{100}{750}$ | $\dfrac{250}{750}$ | $\dfrac{400}{750}$ |
| ALL USER REFERENCE | $\dfrac{400}{1350}$ | $\dfrac{450}{1350}$ | $\dfrac{500}{1350}$ |

FIG. 4A

PRINTING COUNT TABLE TA1, TA11

|  | BASIC | KIDS | CUTE | TOTAL |
|---|---|---|---|---|
| UAT → MALE | 300 | 200 | 100 | 600 |
| UAT → FEMALE | 100 | 250 | 400 | 750 |
| ALL USERS | 400 | 450 | 500 | 1350 |

N1 (BASIC, KIDS, CUTE)    N0 (TOTAL)

FIG. 4B

PRINTING COUNT TABLE TA1, TA12

|  | BASIC | KIDS | CUTE | TOTAL |
|---|---|---|---|---|
| UAT → UNDER TEN YEARS OLD | 50 | 150 | 100 | 300 |
| UAT → IN TENS | 100 | 100 | 150 | 350 |
| UAT → IN TWENTIES | ... | ... | ... | ... |
| ... | ... | ... | ... | ... |
| ALL USERS | 400 | 450 | 500 | 1350 |

N1 (BASIC, KIDS, CUTE)    N0 (TOTAL)

FIG. 4C

PRINTING COUNT TABLE TA1, TA13

|  | BASIC | KIDS | CUTE | TOTAL |
|---|---|---|---|---|
| UAT → MALE UNDER TEN YEARS OLD | 30 | 80 | 10 | 120 |
| UAT → FEMALE UNDER TEN YEARS OLD | 20 | 70 | 90 | 180 |
| UAT → MALE IN TENS | ... | ... | ... | ... |
| UAT → FEMALE IN TENS | ... | ... | ... | ... |
| ... | ... | ... | ... | ... |
| ALL USERS | 400 | 450 | 500 | 1350 |

N1 (BASIC, KIDS, CUTE)    N0 (TOTAL)

FIG. 5

SELECTION PROBABILITY SR

|  | BASIC | KIDS | CUTE |
|---|---|---|---|
| MALE REFERENCE | $\dfrac{300}{600}$ | $\dfrac{200}{600}$ | $\dfrac{100}{600}$ |
| FEMALE REFERENCE | $\dfrac{100}{750}$ | $\dfrac{250}{750}$ | $\dfrac{400}{750}$ |
| ALL USER REFERENCE | $\dfrac{400}{1350}$ | $\dfrac{450}{1350}$ | $\dfrac{500}{1350}$ |

FIG. 9

ATTRIBUTE TABLE TA2

| USER IDENTIFICATION INFORMATION UID | ATTRIBUTE AT |
|---|---|
| UID-001 | MALE IN THIRTIES |
| UID-002 | FEMALE IN THIRTIES |
| UID-003 | MALE UNDER TEN YEARS OLD |
| UID-004 | FEMALE UNDER TEN YEARS OLD |
| ....... | ....... |

FIG. 12

CONTENT STORAGE UNIT 113

CONTENT GROUP G1 (SCRAPBOOKING)

| USER ATTRIBUTE UAT | CONTENT CO1 |
|---|---|
| MALE UNDER TEN YEARS OLD | U10M1, U10M2, ⋯ |
| FEMALE UNDER TEN YEARS OLD | U10F1, U10F2, ⋯ |
| MALE IN TENS | 10M1, 10M2, ⋯ |
| FEMALE IN TENS | 10F1, 10F2, ⋯ |
| MALE IN TWENTIES | 20M1, 20M2, ⋯ |
| FEMALE IN TWENTIES | 20F1, 20F2, ⋯ |

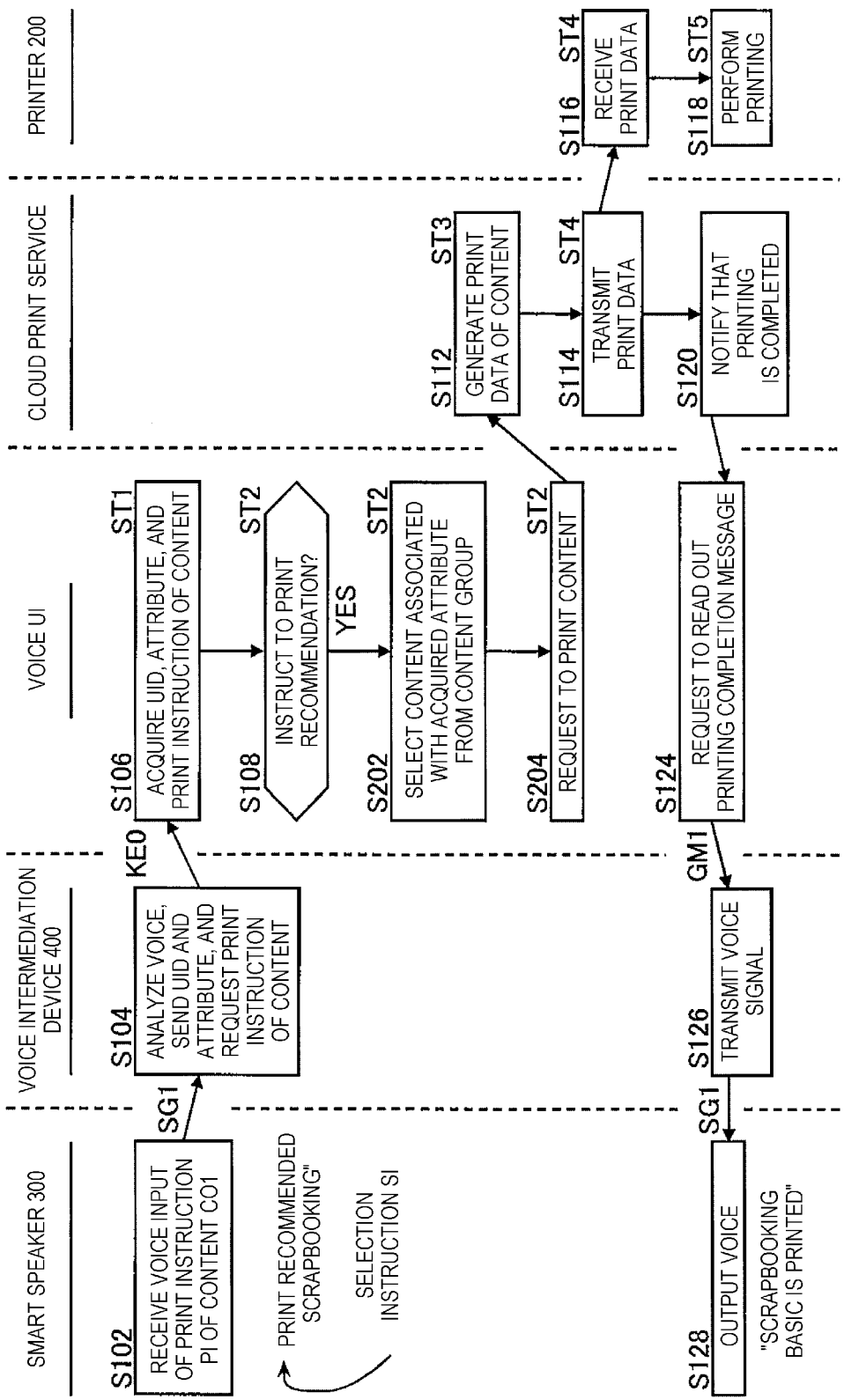

PRINTING SYSTEM AND SERVER

The present application is based on, and claims priority from JP Application Serial Number 2021-186498, filed Nov. 16, 2021, the disclosure of which is hereby incorporated by reference herein in its entirety.

BACKGROUND

1. Technical Field

The present disclosure relates to a printing system including a printing device and a server, and relates to a server.

2. Related Art

In recent years, a printer is caused to perform printing via a server computer that provides a cloud print service.

In recent years, a smart speaker linked with a voice recognition service on a cloud is available on the market.

For reference, JP-A-2015-213256 (Patent Literature 1) discloses a printing system in which an image forming device and a client PC are coupled to each other via a LAN. A voice user of the printing system needs to input print data from the client PC to the image forming device, and then needs to go to the image forming device. In addition, the user can hear a voice indicating the start of printing, the selection of a function, or the like from the image forming device, and an image processing device can be caused to perform a specific function such as copying or boxing using a voice.

In the technique described above, it is not possible to instruct the client PC to print using a voice.

In particular, when a commercially available smart speaker is used for printing, a user designates a content to be printed by voice. Here, when the user does not specify the content to be printed, a server may select a content to be printed from a plurality of contents and cause a printer to perform printing. In this case, there is a possibility that a tendency preferred by a plurality of users is not taken into consideration, and there is a possibility that an attribute of a user who instructed printing is not taken into consideration.

SUMMARY

A printing system according to the present disclosure is a printing system including a printing device and a server coupled to the printing device via a network, in which
  the server includes
    a print instruction acquisition unit configured to acquire, from a voice intermediation device, a print instruction indicated by a voice that is a print instruction of a content included in a content group,
    a selection unit configured to select a content to be printed from the content group according to the print instruction, and
    a transmission unit configured to transmit print data for printing the selected content to the printing device,
  the selection unit totalizes a printing count of each content included in the content group for a plurality of users, and selects the content to be printed from the content group based on the totalized printing count, and
  the printing device receives the print data and performs printing according to the print data.

A printing system according to the present disclosure is a printing system including a printing device and a server coupled to the printing device via a network, in which
  the server includes
    a print instruction acquisition unit configured to acquire, from a voice intermediation device, a print instruction indicated by a voice of a user that is a print instruction of a content included in a content group,
    a selection unit configured to select a content to be printed from the content group according to the print instruction, and
    a transmission unit configured to transmit print data for printing the selected content to the printing device,
  the print instruction acquisition unit acquires an attribute applicable to the user from a plurality of classified user attributes,
  the selection unit selects the content to be printed from the content group based on the acquired attribute, and
  the printing device receives the print data and performs printing according to the print data.

A server according to the present disclosure is a server coupled via a network to a printing device that performs printing according to received print data, the server including:
  a print instruction acquisition unit configured to acquire, from a voice intermediation device, a print instruction indicated by a voice that is a print instruction of a content included in a content group;
  a selection unit configured to select a content to be printed from the content group according to the print instruction; and
  a transmission unit configured to transmit print data for printing the selected content to the printing device, in which
  the selection unit totalizes a printing count of each content included in the content group for a plurality of users, and selects the content to be printed from the content group based on the totalized printing count.

A server according to the present disclosure is a server coupled via a network to a printing device that performs printing according to received print data, the server including:
  a print instruction acquisition unit configured to acquire, from a voice intermediation device, a print instruction indicated by a voice of a user that is a print instruction of a content included in a content group;
  a selection unit configured to select a content to be printed from the content group according to the print instruction; and
  a transmission unit configured to transmit print data for printing the selected content to the printing device, in which
  the print instruction acquisition unit acquires an attribute applicable to the user from a plurality of classified user attributes, and
  the selection unit selects the content to be printed from the content group based on the acquired attribute.

DESCRIPTION OF THE DRAWINGS

FIGS. 4A to 4C are diagrams schematically showing a structure example of a printing count table stored in a storage device.

FIG. 5 is a diagram schematically showing an example of a selection probability according to a printing count.

FIG. 9 is a diagram schematically showing a structure example of an attribute table.

FIG. 12 is a diagram schematically showing another example of a content group stored in the content storage unit.

FIG. 14 is a diagram schematically showing another example of a process of printing a recommended content according to a voice input.

DESCRIPTION OF EXEMPLARY EMBODIMENTS

Hereinafter, embodiments of the present disclosure will be described. As a matter of course, the following embodiments are merely examples of the present disclosure, and all features shown in the embodiments are not necessarily essential to the solution of the present disclosure.

(1) OVERVIEW OF TECHNIQUE

First, an overview of the technique according to the present application will be described with reference to the examples shown in FIGS. 1 to 14. Drawings of the present application are diagrams schematically showing examples, and enlargement ratios in directions shown in these drawings may be different from one another, and the drawings may not be consistent with one another. As a matter of course, elements of the present technique are not limited to specific examples indicated by reference signs. In "Overview of Technique", content in a parenthesis refers to a supplementary explanation of the immediately preceding word.

Figure 1:
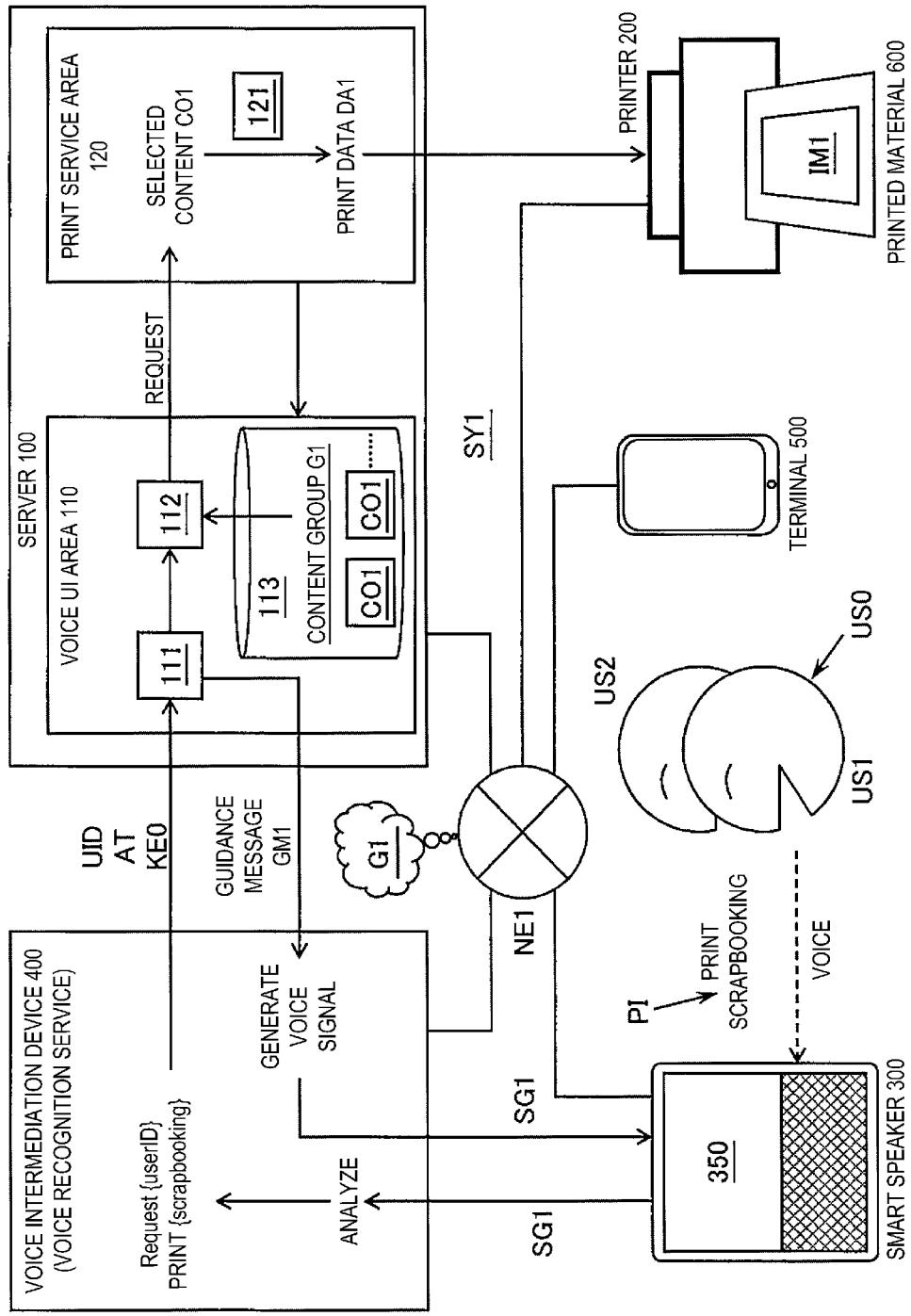
FIG. 1 is a block diagram schematically showing a configuration example of a system including a printing system.

Aspect 1:

As shown in FIG. 1 and the like, a printing system SY1 according to an aspect of the present technique includes a printing device (for example, a printer 200) and a server 100 coupled to the printing device (200) via a network NE1. The server 100 includes a print instruction acquisition unit 111, a selection unit 112, and a transmission unit 121. The print instruction acquisition unit 111 acquires, from a voice intermediation device 400, a print instruction PI indicated by a voice that is a print instruction PI of a content CO1 included in a content group G1. The selection unit 112 selects a content CO1 to be printed from the content group G1 according to the print instruction PI. The transmission unit 121 transmits print data DA1 for printing the selected content CO1 to the printing device (200). Here, the selection unit 112 totalizes a printing count N1 of each content CO1 included in the content group G1 for a plurality of users US0, and selects the content CO1 to be printed from the content group G1 based on the totalized printing count N1. The printing device (200) receives the print data DA1 and performs printing according to the print data DA1.

In the aspect 1 described above, when the content CO1 is printed according to the print instruction PI indicated by a voice, the content CO1 selected in consideration of a tendency preferred by a plurality of users US0 is printed. Therefore, according to the aspect 1, it is possible to provide the printing system SY1 that improves usability.

Here, the server 100 refers to a computer that provides data, and the server 100 may be a single computer or a plurality of computers coupled to one another. The same applies to the following aspects.

Figure 10:
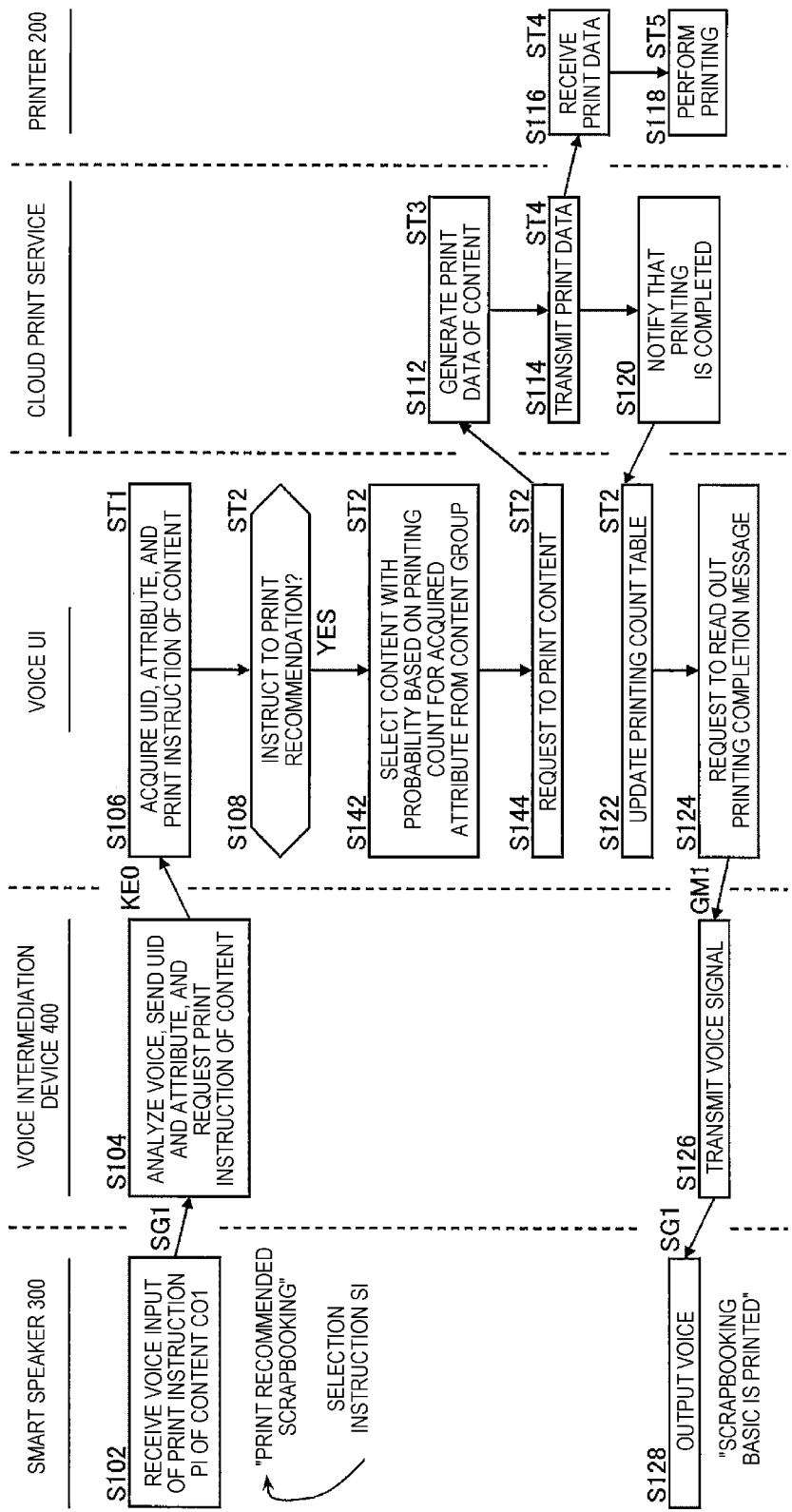
FIG. 10 is a diagram schematically showing an example of a process of printing a recommended content according to a voice input.
Figure 11:
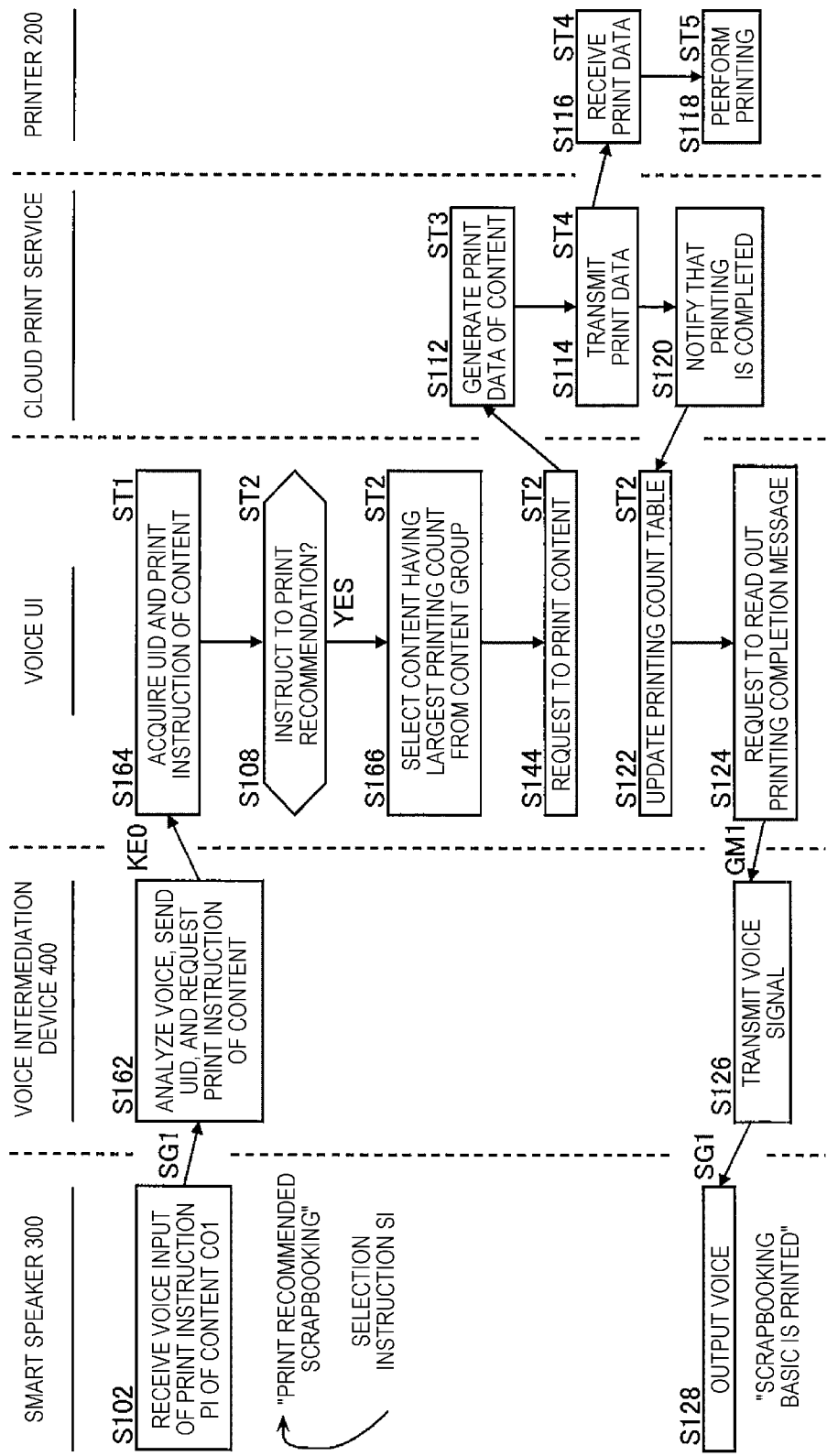
FIG. 11 is a diagram schematically showing another example of a process of printing a recommended content according to a voice input.

Aspect 2:

As shown in FIGS. 10 and 11, the print instruction PI may include a selection instruction SI for causing the selection unit 112 to select a content CO1 based on the printing count N1. When the print instruction acquisition unit 111 acquires the print instruction PI including the selection instruction SI, the selection unit 112 may select a content CO1 to be printed from the content group G1 based on the printing count N1 totalized for a plurality of users US0.

In the above case, the content CO1 is selected based on the printing count N1 according to the print instruction PI including the selection instruction SI for selecting the content CO1 based on the printing count N1. Therefore, according to the aspect 2, it is possible to further improve usability.

Aspect 3:

As shown in FIG. 10, the selection unit 112 may select a content CO1 to be printed from the content group G1 such that each content CO1 included in the content group G1 is selected with a probability (for example, a selection probability SR shown in FIG. 5) based on the printing count N1.

In the aspect 3, when the content CO1 is randomly selected and printed according to the printing instruction PI indicated by a voice, the probability (SR) of selecting the content CO1 changes according to the printing count N1 of each content CO1. Therefore, according to the aspect 3, it is possible to provide a preferable example for improving usability.

Aspect 4:

As shown in FIG. 5, the probability (SR) of selecting each content CO1 included in the content group G1 may be a ratio N1/N0 of the printing count N1 of each content CO1 to a total printing count N0 of a plurality of contents CO1 included in the content group G1. In the aspect 4, since each content CO1 to be printed is selected with a probability (SR) in proportional to the printing count N1 of each content CO1 included in the content group G1, it is possible to provide a more preferable example for improving usability.

Aspect 5:

As shown in FIG. 10, the print instruction acquisition unit 111 may acquire an attribute AT applicable to a user US0 who uttered the voice from a plurality of classified user attributes UAT. The selection unit 112 may classify the printing count N1 of the contents CO1 included in the content group G1 according to the plurality of user attributes UAT and totalize the printing count N1 for a plurality of users US0, or may select a content CO1 to be printed from the content group G1 based on the printing count N1 totalized for the acquired attribute AT among the plurality of user attributes UAT.

In the above case, when the content CO1 is printed according to the printing instruction PI indicated by a voice, the content CO1 selected in consideration of the attribute AT of the user US0 is printed. Therefore, according to the aspect 5, it is possible to further improve usability.

Aspect 6:

The selection unit 112 may select a content CO1 to be printed from the content group G1 such that each content CO1 included in the content group G1 is selected with a probability (SR) based on the printing count N1 totalized for an acquired attribute AT among a plurality of user attributes UAT.

In the aspect 6, when the content CO1 is randomly selected and printed according to the printing instruction PI indicated by a voice, the probability (SR) of selecting the content CO1 changes according to the printing count N1 of each content CO1 corresponding to the attribute AT of the user US0. Therefore, according to the aspect 6, it is possible to provide a preferable example for improving usability.

Aspect 7:

As shown in FIG. 5, the probability (SR) of selecting each content CO1 included in the content group G1 may be a ratio N1/N0 of the printing count N1 of each content CO1 to a total printing count N0 of a plurality of contents CO1 included in the content group G1 when the printing count N1 is totalized for the acquired attribute AT among a plurality of user attributes UAT. In the aspect 7, since each content CO1 to be printed is selected with a probability (SR) in proportional to the printing count N1 corresponding to the attribute AT of the user US0 of each content CO1 included in the content group G1, it is possible to provide a more preferable example for improving usability.

Aspect 8:

A printing system SY1 according to another aspect of the present technique includes the printing device (200) and the server 100 coupled to the printing device (200) via the network NE1. The server 100 includes the print instruction acquisition unit 111, the selection unit 112, and the transmission unit 121. The print instruction acquisition unit 111 acquires, from the voice intermediation device 400, a print instruction PI indicated by a voice of a user US0 that is a print instruction PI of a content CO1 included in the content group G1. The selection unit 112 selects a content CO1 to be printed from the content group G1 according to the print instruction PI. The transmission unit 121 transmits print data DA1 for printing the selected content CO1 to the printing device (200). Here, the print instruction acquisition unit 111 acquires an attribute AT applicable to the user US0 from a plurality of classified user attributes UAT. The selection unit 112 selects the content CO1 to be printed from the content group G1 based on the acquired attribute AT. The printing device (200) receives the print data DA1 and performs printing according to the print data DA1.

In the aspect 8, when the content CO1 is printed according to the print instruction PI indicated by a voice, the content CO1 selected in consideration of the attribute AT of the user US0 is printed. Therefore, according to the aspect 8, it is possible to provide the printing system SY1 that improves usability.

Aspect 9:

As shown in FIGS. 10 and 14, the print instruction PI may include a selection instruction SI for causing the selection unit 112 to select a content CO1 based on the attribute AT. When the print instruction acquisition unit 111 acquires the print instruction PI including the selection instruction SI, the selection unit 112 may select a content CO1 to be printed from the content group G1 based on the attribute AT applicable to the user US0 from the user attributes UAT.

In the above case, the content CO1 is selected based on the attribute AT applicable to the user US0 according to the print instruction PI including the selection instruction SI for selecting the content CO1 based on the attribute AT. Therefore, according to the aspect 9, it is possible to further improve usability.

Aspect 10:

As shown in FIGS. 4A to 4C, the user attributes UAT may include at least one of gender and age.

In the aspect 10, when a content CO1 is printed according to the print instruction PI indicated by a voice, the content CO1 selected in consideration of at least one of gender of the user US0 and age of the user US0 is printed. Therefore, according to the aspect 10, it is possible to provide a suitable printing system SY1 that improves usability.

Although not included in the aspect 10, the user attributes UAT may include a place of residence or the like of the user US0.

Figure 13:
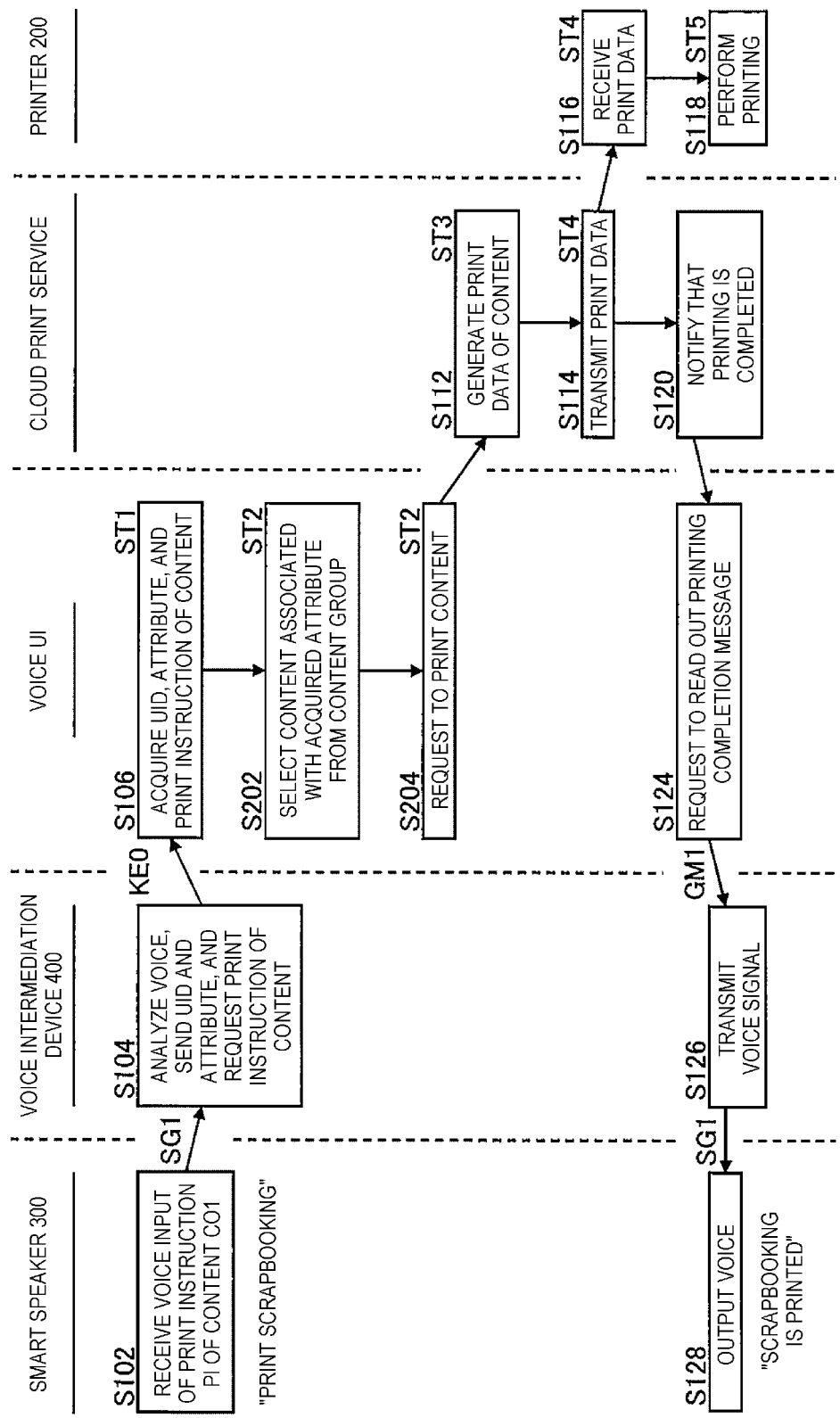
FIG. 13 is a diagram schematically showing another example of a process of printing a content according to a voice input.

Aspect 11:

As shown in FIGS. 10, 13, and the like, the print instruction acquisition unit 111 may acquire an attribute AT applicable to the user US0 from the voice intermediation device 400.

In the above case, the printing system SY1 does not need to prepare an information table for identifying the attribute AT applicable to the user US0. Therefore, according to the aspect 11, it is possible to provide a suitable printing system SY1 that improves usability.

Although not included in the aspect 11, the present technique also includes a case in which the print instruction acquisition unit 111 acquires the attribute AT applicable to the user US0 based on the information table prepared in the printing system SY1.

Aspect 12:

As shown in FIG. 1 and the like, the server 100 may further include a content storage unit 113 that stores the content group G1. According to the aspect 12, it is possible to provide a preferable example in which a content CO1 to be printed is selected from the content group G1.

Aspect 13:

Further, the server 100 according to an aspect of the present technique is coupled, via the network NE1, to the printing device (200) that performs printing according to received print data DA1. The server 100 includes the print instruction acquisition unit 111, the selection unit 112, and the transmission unit 121. The print instruction acquisition unit 111 acquires, from the voice intermediation device 400, a print instruction PI indicated by a voice that is a print instruction PI of a content CO1 included in a content group G1. The selection unit 112 selects a content CO1 to be printed from the content group G1 according to the print instruction PI. The transmission unit 121 transmits print data DA1 for printing the selected content CO1 to the printing device (200). Here, the selection unit 112 totalizes a printing count N1 of each content CO1 included in the content group G1 for a plurality of users US0, and selects a content CO1 to be printed from the content group G1 based on the totalized printing count N1. Therefore, according to the aspect 13, it is possible to provide the server 100 for improving usability.

It is also possible to add the aspects 2 to 7 and the aspects 9 to 12 to the aspect 13.

Aspect 14:

Further, the server 100 according to an aspect of the present technique is coupled, via the network NE1, to the printing device (200) that performs printing according to received print data DA1. The server 100 includes the print instruction acquisition unit 111, the selection unit 112, and the transmission unit 121. The print instruction acquisition unit 111 acquires, from the voice intermediation device 400, a print instruction PI indicated by a voice of a user US0 that is a print instruction PI of a content CO1 included in the content group G1. The selection unit 112 selects a content CO1 to be printed from the content group G1 according to the print instruction PI. The transmission unit 121 transmits print data DA1 for printing the selected content CO1 to the printing device (200). Here, the print instruction acquisition unit 111 acquires an attribute AT applicable to a user US0 from a plurality of classified user attributes UAT. The selection unit 112 selects a content CO1 to be printed from the content group G1 based on the acquired attribute AT. Therefore, according to the aspect 14, it is possible to provide the server 100 for improving usability.

It is possible to add the aspects 9 to 12 to the aspect 14.

Furthermore, the present technique can be applied to a multifunction system including the printing system SY1 described above, a multifunction device including the server 100 described above, a printing method implemented by the printing system SY1 described above, a printing control method implemented by the server 100 described above, a printing program that causes a computer to implement functions corresponding to units of the printing system SY1 described above, a printing control program PR1 that causes a computer to implement functions corresponding to units of the server 100 described above, a computer readable medium that stores the program, and the like.

(2) SPECIFIC CONFIGURATION EXAMPLE OF PRINTING SYSTEM SY1

FIG. 1 schematically shows a specific configuration example of a system including the printing system SY1. The system includes the server 100, the printer 200, a smart speaker 300, and the voice intermediation device 400, and may include a terminal 500. The printing system SY1 includes the server 100 and the printer 200. A user US0 can directly operate the printer 200, the smart speaker 300, and the terminal 500. The printer 200, the smart speaker 300, and the terminal 500 may be shared by a plurality of users such as a first user US1 and a second user US2. In this case, the user US0 collectively refers to the first user US1 and the second user US2. In the present application, "first", "second", . . . are terms for identifying components included in a plurality of components having similarities, and do not indicate an order. The server 100, the printer 200, the smart speaker 300, the voice intermediation device 400, and the terminal 500 are coupled to the network NE1 including the Internet. The network NE1 including the Internet may include a LAN. Here, LAN is an abbreviation of Local Area Network. The connection to the network NE1 may be a wired connection, a wireless connection, or both a wired connection and a wireless connection.

In this specific example, on the premise that a large number of users US0 use the printing system SY1, a plurality of combinations of the printer 200 and the smart speaker 300 linked to each other are present in the system including the printing system SY1. The large number of users US0 include males and females of various ages.

The server 100 is a server computer that provides a function called a cloud print service, and opens a function called a voice UI to the voice intermediation device 400. Here, UI is an abbreviation of a user interface. When printing the content CO1, the server 100 transmits print data DA1 based on a keyword KE0 from the voice intermediation device 400 to the printer 200. The printer 200 is a printing device that forms a print image IM1 according to the print data DA1 transmitted from the server 100. The smart speaker 300 is a voice input and output device that uses a function called a voice recognition service provided by the voice intermediation device 400. The voice intermediation device 400 is a server computer that provides the voice recognition service using AI. Here, AI is an abbreviation of artificial intelligence.

In the following description, the "voice UI" refers to a portion of the server 100 that has the function of the voice UI, and the "cloud print service" refers to a portion of the server 100 that has the function of the cloud print service. The keyword KE0 may be any word that is handled collectively when specifying a printing target. The keyword KE0 is not limited to a word, and may be a phrase, a sentence, or the like.

The server 100 includes a voice UI area 110 that is a storage area of information for implementing the voice UI, and a print service area 120 that is a storage area of information for implementing the cloud print service. The voice UI is a service constructed by a provider of the cloud print service on a platform of a voice recognition service. The voice UI area 110 includes an information area for implementing the print instruction acquisition unit 111, the selection unit 112, and the content storage unit 113. The content storage unit 113 stores a content group G1 including a plurality of contents CO1. The content group G1 is not limited to being stored in the content storage unit 113. At least a part of the content group G1 may be stored in the print service area 120, or may be stored in a server computer different from the server 100. The print service area 120 includes an information area for implementing the transmission unit 121. The server 100 executes a plurality of processes for implementing the voice UI and the cloud print service in parallel. The voice UI and the cloud print service may be constructed by separate computers. The voice UI may be constructed in a server computer that provides the voice recognition service.

For example, when the user US0 utters "print scrapbooking", the smart speaker 300 converts a voice from the user US0 into a digital voice signal SG1, and transmits the voice signal SG1 to the voice intermediation device 400 via the network NE1. In this case, "print scrapbooking" is a print instruction PI of a content CO1 included in the content group G1, and is a print instruction PI indicated by a voice. The voice intermediation device 400 that received the voice signal SG1 acquires user identification information UID that is identification information of the user US0, analyzes the voice based on the voice signal SG1, requests the voice UI to perform printing when a print request keyword "print" is included in the voice, and transmits the user identification information UID and a keyword KE0 such as "scrapbooking" included in the voice to the voice UI. The voice intermediation device 400 may receive smart speaker identification information 300id shown in FIG. 7 from the smart speaker 300 and acquire the user identification information UID of the user US0 associated with the smart speaker identification information 300id. The voice intermediation device 400 may identify the user US0 based on the voice signal SG1 and acquire the user identification information UID of the identified user US0. In FIG. 1, "Request {userID} print {scrapbooking}", "{userID}" refers to the user identification information UID, and "{scrapbooking}" refers to a keyword such as "scrapbooking". The voice intermediation device 400 according to the specific example also transmits an attribute AT applicable to the user US0 who uttered the print instruction PI to the voice UI. The voice UI that received the user identification information UID, the attribute AT, and the keyword KE0 together with the print request keyword performs a process according to the keyword KE0.

The cloud print service that received the print request generates print data DA1 using the content CO1, and transmits the print data DA1 to the printer 200 associated with the user identification information UID via the network NE1. The printer 200 that received the print data DA1 performs printing according to the print data DA1, and forms a printed material 600 having a print image IM1 based on the print data DA1. Accordingly, the content CO1 of "scrapbooking" uttered by the user US0 is printed. The user US0 may designate the printer 200 assumed as an output destination by not only speaking a printing target using the keyword KE0 but also speaking "print scrapbooking using A company printer" or the like.

As a matter of course, the print request keyword is not limited to "print", and various similar variations such as "perform printing of" can be considered. Therefore, a process on a voice including these variations may be performed in a similar manner to the process on a voice including the print request keyword "print".

The voice UI also performs a process of transmitting a guidance message GM1 such as "scrapbooking is printed" to the voice intermediation device 400. The voice intermediation device 400 that received the guidance message GM1 converts the guidance message GM1 into a digital voice signal SG1, and transmits the voice signal SG1 to the smart speaker 300 via the network NE1. The smart speaker 300 that received the voice signal SG1 converts the voice signal SG1 into a voice, and outputs the voice such as "scrapbooking is printed".

Figure 2:
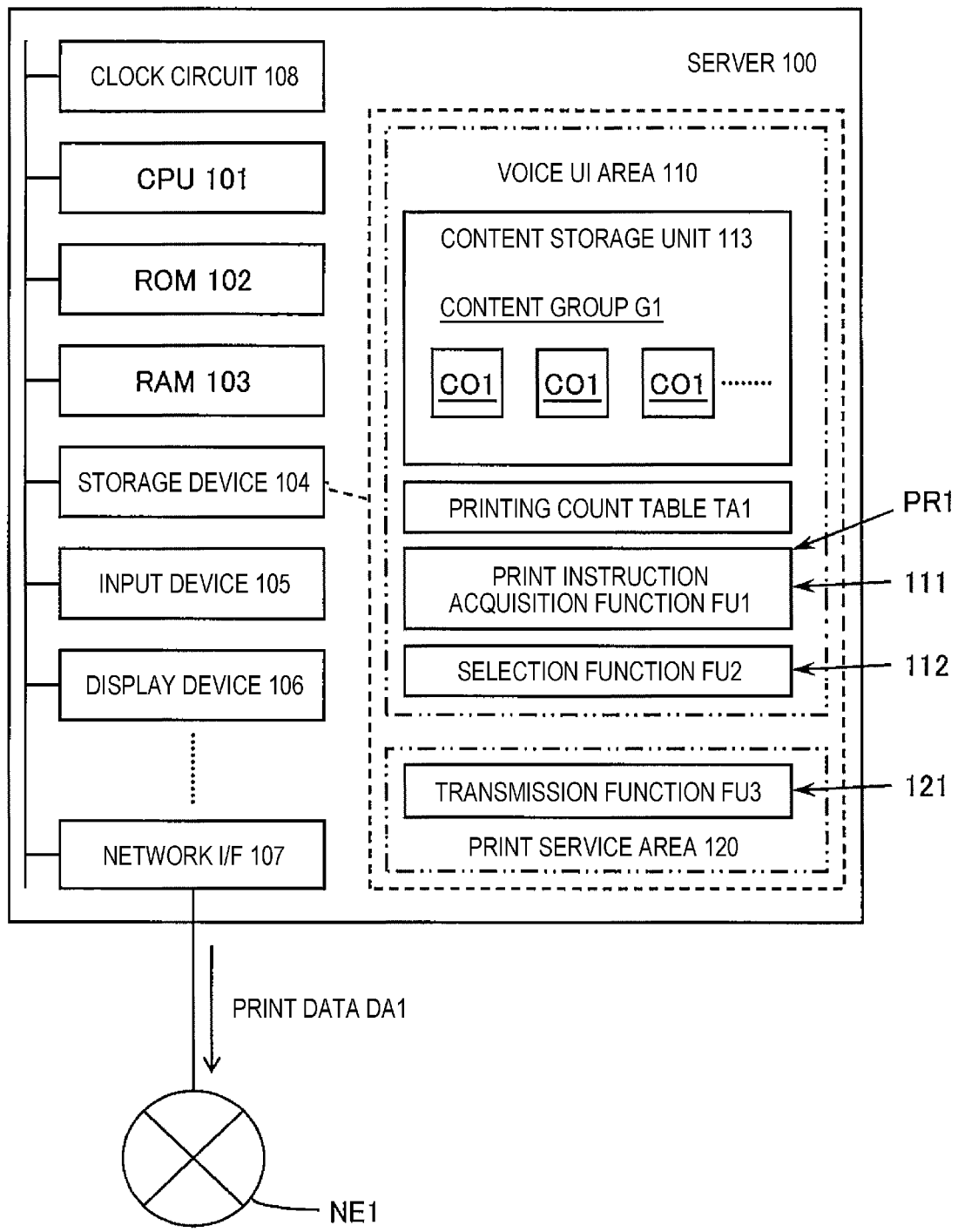
FIG. 2 is a block diagram schematically showing a configuration example of a server.

FIG. 2 schematically shows a configuration of the server 100. Although the server 100 shown in FIG. 2 is a single server computer having the voice UI area 110 and the print service area 120, the server 100 may be implemented by a plurality of server computers coupled to one another. For example, the server 100 may have a configuration in which a server computer having the voice UI area 110 and a server computer having the print service area 120 are separately provided. The voice UI area 110 may be constructed in a server computer that provides a voice recognition service. In this case, the server 100 is also implemented in a manner of including the voice UI area 110 and the print service area 120.

The server 100 shown in FIG. 2 includes a CPU 101 which is a processor, a ROM 102 which is a semiconductor memory, a RAM 103 which is a semiconductor memory, a storage device 104, an input device 105, a display device 106, a network I/F 107, a clock circuit 108, and the like. These elements are electrically coupled to one another, and thus can input information to and output information from one another. Here, CPU is an abbreviation of Central Processing Unit, ROM is an abbreviation of Read Only Memory, RAM is an abbreviation of Random Access Memory, and I/F is an abbreviation of interface.

The storage device 104 stores an OS (not shown) and the like, and includes the voice UI area 110 and the print service area 120 described above. Here, the OS is an abbreviation of an operating system. The voice UI area 110 includes the content storage unit 113 and a printing count table TA1, and stores a program and the like for causing the server 100 to implement a print instruction acquisition function FU1 and a selection function FU2. The content storage unit 113 stores a content group G1 including a plurality of contents CO1. The printing count table TA1 includes a totalizing result of a printing count of each content CO1 instructed by a plurality of users US0. The print service area 120 stores a program or the like for causing the server 100 to implement a transmission function FU3. A print control program PR1 includes a program that causes the server 100 to implement the print instruction acquisition function FU1, the selection function FU2, and the transmission function FU3. Information stored in the storage device 104 is appropriately read to the RAM 103 and used for a process for causing the printer 200 to perform printing. The storage device 104 may be a magnetic storage device such as a hard disk, a nonvolatile semiconductor memory such as a flash memory, or the like. The print control program PR1 can be regarded as a print application from the viewpoint of the user US0.

The input device 105 may be a pointing device, a hard key including a keyboard, a touch panel attached to a surface of a display panel, or the like. The display device 106 may be a liquid crystal display panel or the like. The network I/F 107 is coupled to the network NE1, and communicates with a partner device coupled to the network NE1 according to a predetermined communication standard. The transmission unit 121 transmits the print data DA1 from the network I/F 107 to the printer 200. The clock circuit 108 can output a current date and time.

The CPU 101 executes the print control program PR1 read from the storage device 104 to the RAM 103 to perform a print instruction acquisition process corresponding to the print instruction acquisition function FU1, a selection process corresponding to the selection function FU2, and a print data transmission process corresponding to the transmission function FU3. The print control program PR1 causes the server 100 which is a computer to function as the print instruction acquisition unit 111 corresponding to the print instruction acquisition function FU1, the selection unit 112 corresponding to the selection function FU2, and the transmission unit 121 corresponding to the transmission function FU3. As shown in FIG. 10 and the like, the server 100 that executes the print control program PR1 performs a print instruction acquisition step ST1, a selection step ST2, a print data generation step ST3, a print data transmission step ST4, and a printing step ST5. A computer-readable medium that stores the print control program PR1 is not limited to the storage device 104, and may be a recording medium provided outside the server 100.

Figure 3:
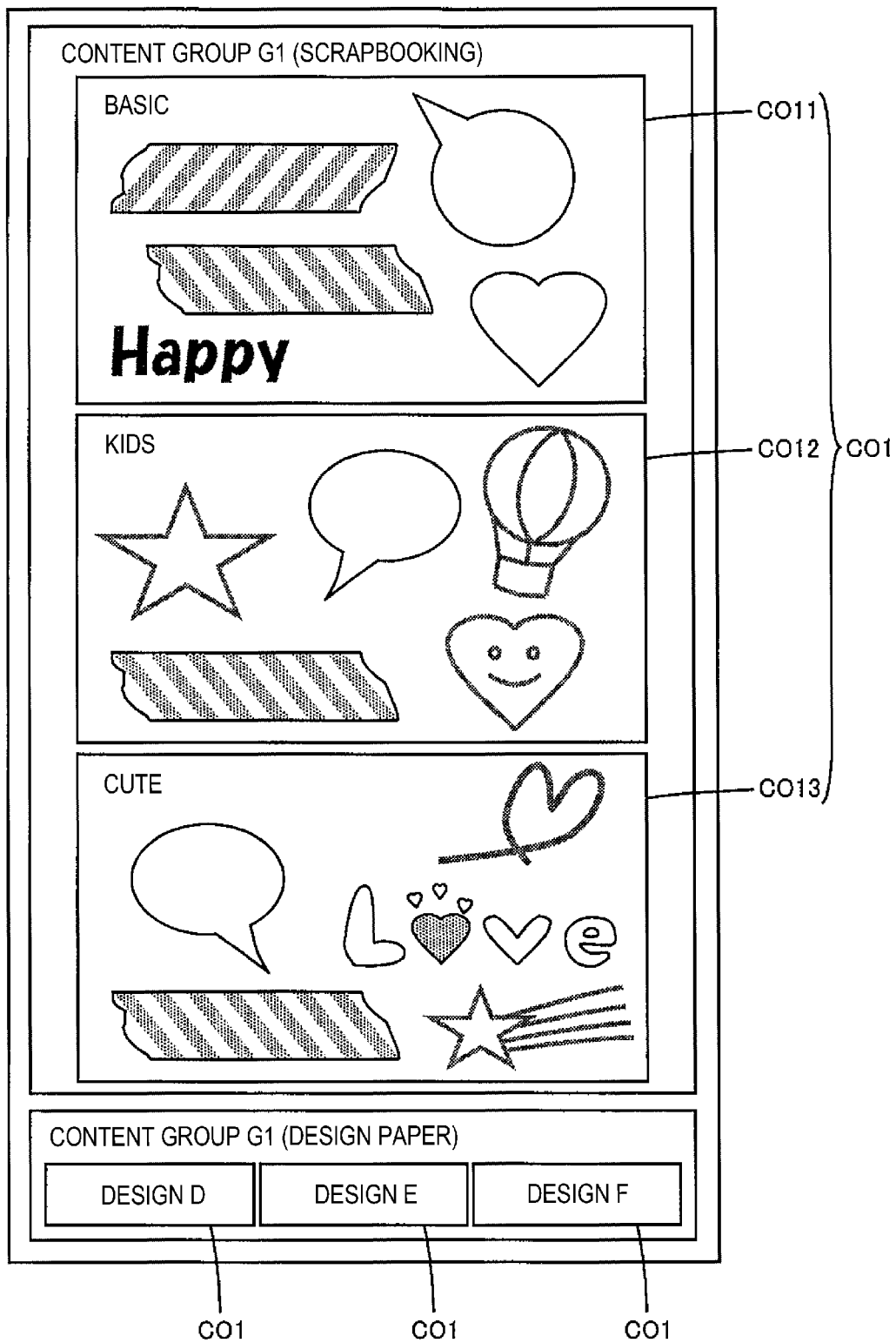
FIG. 3 is a diagram schematically showing an example of a content group stored in a content storage unit.

FIG. 3 schematically shows a structure of the content group G1 stored in the content storage unit 113. FIG. 3 shows a content group G1 of scrapbooking and a content group G1 of design paper. As a matter of course, the content storage unit 113 may store a content group of a recipe and the like. Each content group G1 includes a plurality of contents CO1.

The content group G1 of scrapbooking shown in FIG. 3 includes a basic content CO11, a kids content CO12, and a cute content CO13. The content CO1 is a general term for the basic content CO11, the kids content CO12, and the cute content CO13. As a matter of course, the number of the contents CO1 included in the content group G1 may be two, or may be four or more. The basic content CO11 includes a material that can be used for scrapbooking over a wide age range regardless of gender. The kids content CO12 includes a material that tends to be preferred by kids as a material that can be used for scrapbooking. The cute content CO13 includes a material for which cuteness is emphasized as a material that can be used for scrapbooking.

The content group G1 of design paper shown in FIG. 3 includes a content CO1 of a design D, a content CO1 of a design E, and a content CO1 of a design F.

When the user US0 who uttered the print instruction PI does not specify a content CO1 to be printed, the server 100 may select a content CO1 to be printed from the content group G1 and cause the printer 200 to perform printing. When the content CO1 to be printed is randomly selected from the content group G1, there is a possibility that a preference tendency of a large number of users US0 who use the printing system SY1 is not taken into consideration, or there is a possibility that an attribute AT of a user US0 who instructed the printing is not taken into consideration. For example, when the server 100 selects a content CO1 to be printed from the content group G1 of scrapbooking, even though a large number of users US0 prefer the basic content CO11, the cute content CO13 may be selected more than the other contents. In addition, although a user US0 who uttered the print instruction PI is a male adult and does not prefer the kids content CO12, the server 100 may select the kids content CO12 more than the other contents.

Therefore, in this specific example, the selection unit 112 of the server 100 totalizes a printing count of each content CO1 included in the content group G1 for a plurality of users US0, and selects a content CO1 to be printed from the content group G1 based on the totalized printing count. When the selection unit 112 considers an attribute AT of a user US0 who uttered the print instruction PI, the selection unit 112 selects a content CO1 to be printed from the content group G1 based on a printing count totalized for an attribute AT applicable to the user US0 who uttered the print instruction PI.

FIGS. 4A to 4C schematically show a structure of the printing count table TA1 stored in the storage device 104. The printing count table TA1 collectively refers to a printing count table TA11 shown in FIG. 4A, a printing count table TA12 shown in FIG. 4B, and a printing count table TA13 shown in FIG. 4C. The selection unit 112 of the server 100 uses one of the printing count table TA11, the printing count table TA12, and the printing count table TA13 to select a content CO1 to be printed.

The printing count table TA1 shown in FIGS. 4A to 4C includes a printing count N1, and a total printing count N0 that is calculated for each user attribute UAT. The printing count N1 is the number of times at which each content CO1 included in the content group G1 is printed for each user attribute UAT. The total printing count N0 for each user attribute UAT is the sum of all printing counts N1 of a plurality of contents CO1 included in the content group G1 for each user attribute UAT. The printing count table TA1 shown in FIGS. 4A to 4C also stores a printing count N1 that is a totalized printing count for all users US0 regardless of the user attribute UAT, and a total printing count N0 that is a totalized printing count of such printing counts N1.

In the printing count table TA11 shown in FIG. 4A, the printing count N1 of each content CO1 included in the content group G1 and the total printing count N0 that is a totalized printing count of such printing counts N1 are stored in a manner of being classified according to the gender of the user US0. In the printing count table TA11, the gender is an example of the user attribute UAT. When using the printing count table TA11 shown in FIG. 4A, the selection unit 112 of the server 100 classifies the printing count N1 of each content CO1 included in the content group G1 according to the gender and totalizes the printing count N1 for a plurality of users US0, and stores the obtained printing count N1 in the printing count table TA1. In addition, the selection unit 112 totalizes all printing counts N1 corresponding to the gender, and stores the obtained total printing count N0 in the printing count table TA11.

In the printing count table TA12 shown in FIG. 4B, the printing count N1 of each content CO1 included in the content group G1 and the total printing count N0 that is a totalized printing count of such printing counts N1 are stored in a manner of being classified according to an age range of the user US0. In the printing count table TA12, the age range is an example of the user attribute UAT. The age range serving as the user attribute UAT is included in the age serving as the user attribute UAT. When using the printing count table TA12 shown in FIG. 4B, the selection unit 112 of the server 100 classifies the printing count N1 of each content CO1 included in the content group G1 according to the age range and totalizes the printing count N1 for a plurality of users US0, and stores the obtained printing count N1 in the printing count table TA1. In addition, the selection unit 112 totalizes all printing counts N1 corresponding to the age range, and stores the obtained total printing count N0 in the printing count table TA12.

In the printing count table TA13 shown in FIG. 4C, the printing count N1 of each content CO1 included in the content group G1 and the total printing count N0 that is a totalized printing count of such printing counts N1 are stored in a manner of being classified according to gender and an age range of the user US0. In the printing count table TA13, the gender and the age range are examples of the user attribute UAT. When using the printing count table TA13 shown in FIG. 4C, the selection unit 112 of the server 100 classifies the printing count N1 of each content CO1 included in the content group G1 according to the gender and the age range and totalizes the printing count N1 for a plurality of users US0, and stores the obtained printing count N1 in the printing count table TA1. In addition, the selection unit 112 totalizes all printing counts N1 corresponding to the gender and the age range, and stores the obtained total printing count N0 in the printing count table TA13.

FIG. 5 schematically shows a selection probability SR based on the printing count table TA11 shown in FIG. 4A as an example of the selection probability SR of each content CO1 corresponding to the printing count N1. In FIG. 5, a male reference indicates a selection probability SR based on a printing count N1 totalized for the male serving as the user attribute UAT, and a female reference indicates a selection probability SR based on a printing count N1 totalized for the female serving as the user attribute UAT. An all user reference indicates a selection probability SR based on a printing count N1 totalized for all users US0 regardless of the user attribute UAT.

In a case in which the printing count N1 is totalized for gender, the selection probability SR of each content CO1 is a ratio N1/N0 of the printing count N1 of each content CO1 to the total printing count N0 of the plurality of contents CO1 included in the content group G1 for gender. For example, in a case in which an attribute AT applicable to the user US0 who uttered the print instruction PI of scrapbooking is male, the selection probability SR of the basic content CO11 is N1/N0=300/600. When an attribute AT applicable to the user US0 who uttered the print instruction PI of scrapbooking is female, the selection probability SR of the basic content CO11 is N1/N0=100/750.

When the printing count N1 is totalized for all users US0 regardless of the user attribute UAT, the selection probability SR of each content CO1 is a ratio N1/N0 of the printing count N1 totalized for all users US0 to the total printing count N0. For example, the selection probability SR of the basic content CO11 is N1/N0=400/1350.

Figure 6:
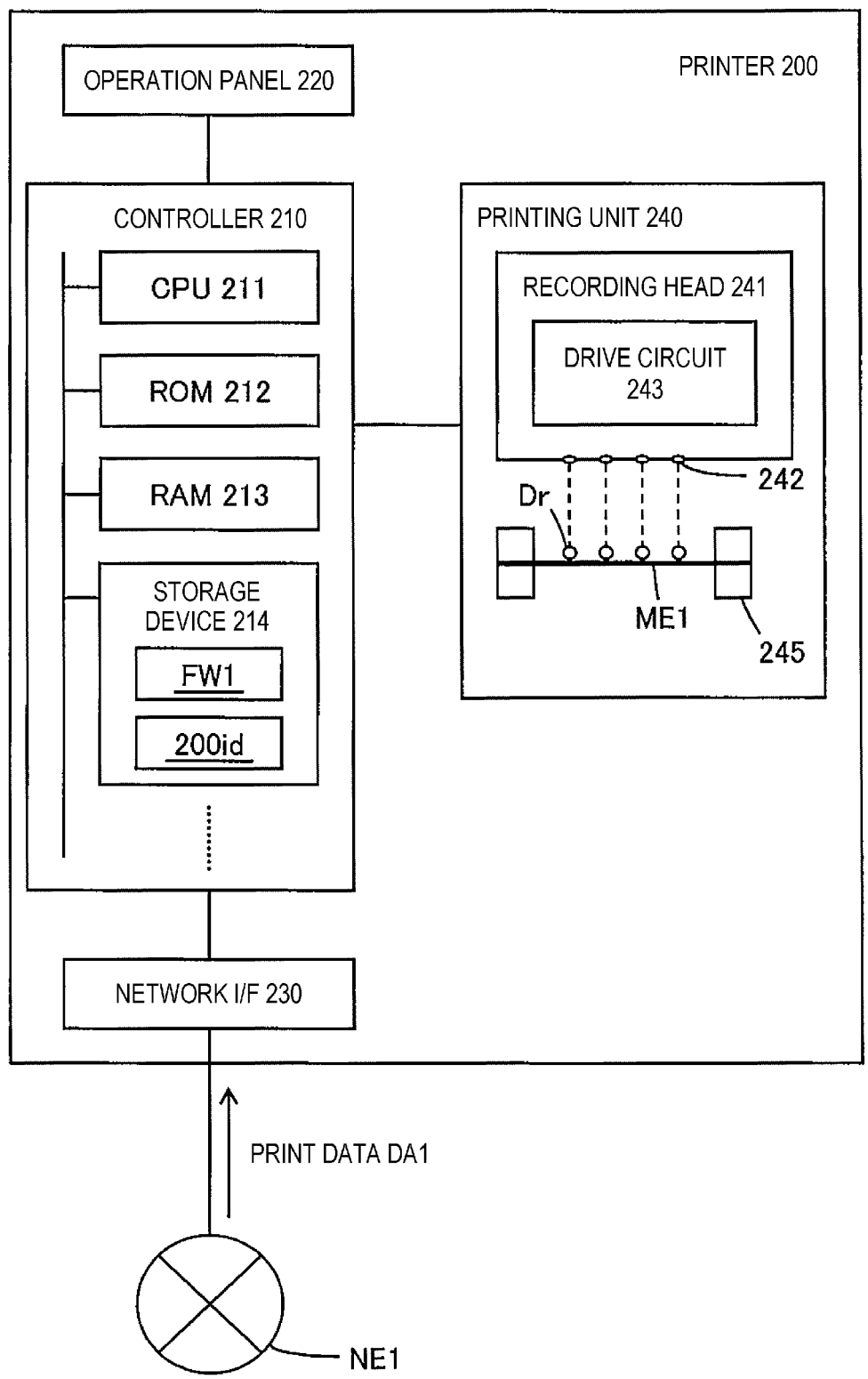
FIG. 6 is a block diagram schematically showing a configuration example of a printing device.

FIG. 6 schematically shows a configuration of the printer 200. The printer 200 shown in FIG. 6 is a printing device capable of printing a content CO1 according to the print data DA1 received via the network NE1. The printer 200 that can be used in the printing system SY1 is not particularly limited, and may be an electrophotographic printer such as an inkjet printer, a laser printer, or the like. As a matter of course, the printer 200 may be a copier, a facsimile, a multifunction device having these functions, or the like. FIG. 6 shows the configuration of the printer 200 in a case in which the printer 200 is an inkjet printer.

The printer 200 shown in FIG. 6 includes a controller 210, an operation panel 220, a network I/F 230, and a printing unit 240.

The controller 210 includes a CPU 211, a ROM 212, a RAM 213, a storage device 214, and the like. These elements are electrically coupled to one another, and thus can input information to and output information from one another. That is, the printer 200 is also a type of computer. The storage device 214 stores firmware FW1 that causes a computer to function as the printer 200, printer identification information 200id for identifying the printer 200, and the like. The printer identification information 200id may be a mail address, an IP address, a serial number, or the like. Here, IP address is an abbreviation of Internet Protocol Address. The storage device 214 may be a nonvolatile semiconductor memory such as a flash memory, a magnetic storage device such as a hard disk, or the like.

The operation panel 220 includes a display unit, an operation input unit, and the like, and receives an operation from a user. The display unit is implemented by, for example, a liquid crystal panel, and displays information indicating a state of the printer 200, information indicating an instruction of a user, and the like. The operation input unit includes, for example, a plurality of operation keys including a cursor key and an enter key. The operation input unit may be a touch panel or the like that receives an operation on a display screen.

The network I/F 230 is coupled to the network NE1 and communicates with a partner device coupled to the network NE1 according to a predetermined communication standard.

The printing unit 240 includes a recording head 241 that ejects droplets Dr such as ink droplets onto a print substrate ME1, and a paper feeding unit 245 that conveys the print substrate ME1. The recording head 241 includes a plurality of nozzles 242 from which the droplets Dr are ejected, and a drive circuit 243 that causes the droplets Dr to be ejected from the nozzles 242. The drive circuit 243 may be a circuit configured to drive a piezoelectric element that applies pressure to liquid in a pressure chamber communicating with each nozzle 242, a circuit configured to drive a thermal element that generates bubbles using heat in the liquid in each pressure chamber, or the like. When the droplets Dr land on the print substrate ME1 conveyed by the paper feeding unit 245, the print image IM1 corresponding to the print data DA1 transmitted from the server 100 is formed on the print substrate ME1.

The print substrate ME1 is a material that holds the print image IM1. The print substrate ME1 may use paper, resin, metal, or the like. A shape of the print substrate ME1 is generally a rectangular shape or a roll shape, and may be a substantially circular shape such as an optical disc, a polygonal shape, a three-dimensional shape, or the like other than a rectangular shape.

Figure 7:
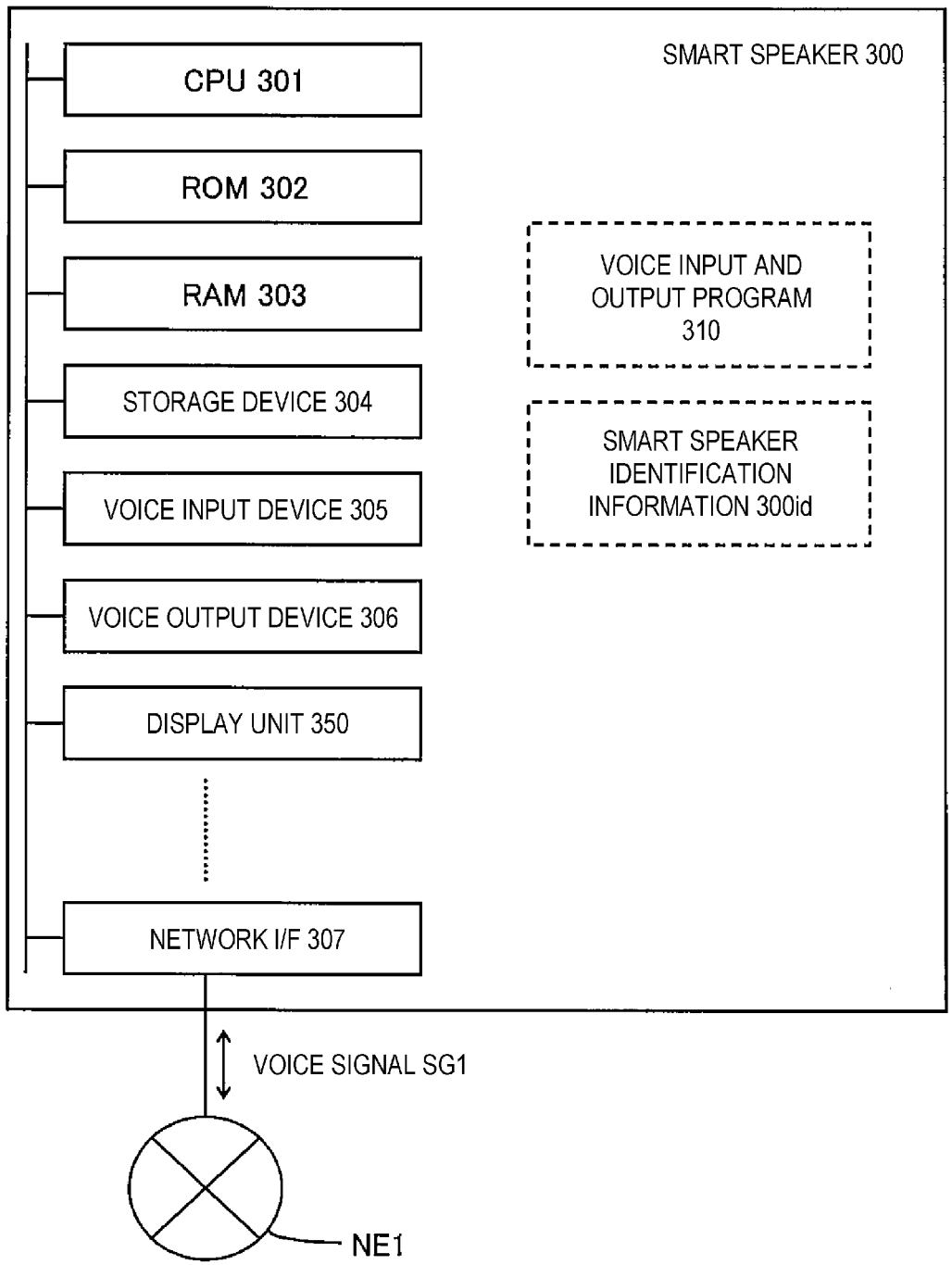
FIG. 7 is a block diagram schematically showing a configuration example of a voice input and output device.

FIG. 7 schematically shows a configuration of the smart speaker 300 that uses a voice recognition service provided by the voice intermediation device 400. The smart speaker 300 shown in FIG. 7 includes a CPU 301, a ROM 302, a RAM 303, a storage device 304, a voice input device 305, a voice output device 306, a network I/F 307, a display unit 350, and the like. These elements are electrically coupled to one another, and thus can input information to and output information from one another. That is, the smart speaker 300 is also a type of computer. The storage device 304 stores a voice input and output program 310 for causing a computer to function as the smart speaker 300, smart speaker identification information 300id for identifying the smart speaker 300, and the like. The storage device 304 may be a nonvolatile semiconductor memory such as a flash memory, a magnetic storage device such as a hard disk, or the like. The display unit 350 includes, for example, a liquid crystal panel, and displays information indicating a state of the smart speaker 300 and the like.

Instead of the smart speaker 300 including the display unit 350, a smart speaker that does not include a display unit may be used.

The voice input device 305 includes a microphone, converts a voice received from the outside into an analog electric signal using the microphone, and converts the electric signal into a digital voice signal SG1. The number of the voice input devices 305 provided in the smart speaker 300 may be one, or may be two or more. The voice output device 306 includes a speaker in a narrow sense that converts an electric signal into a voice, converts the digital voice signal SG1 into an analog electric signal, converts the analog electric signal into a voice using the speaker, and outputs the voice to the outside. The number of the voice output devices 306 provided in the smart speaker 300 may be one, or may be two or more. The network I/F 307 is coupled to the network NE1 and communicates with a partner device coupled to the network NE1 according to a predetermined communication standard.

The voice intermediation device 400 shown in FIG. 1 is a server computer, and includes, for example, a CPU, a ROM, a RAM, a storage device, an input device, a display device, a network I/F, and the like.

The terminal 500 shown in FIG. 1 is used to perform an operation of registering the printer 200 in a cloud print service. The terminal 500 may be used to perform an operation of registering the smart speaker 300 in the voice intermediation device 400. The terminal 500 may be a mobile terminal such as a smartphone or a tablet terminal, a personal computer, or the like.

(3) SPECIFIC EXAMPLE OF PROCESS OF SYSTEM

Figure 8:
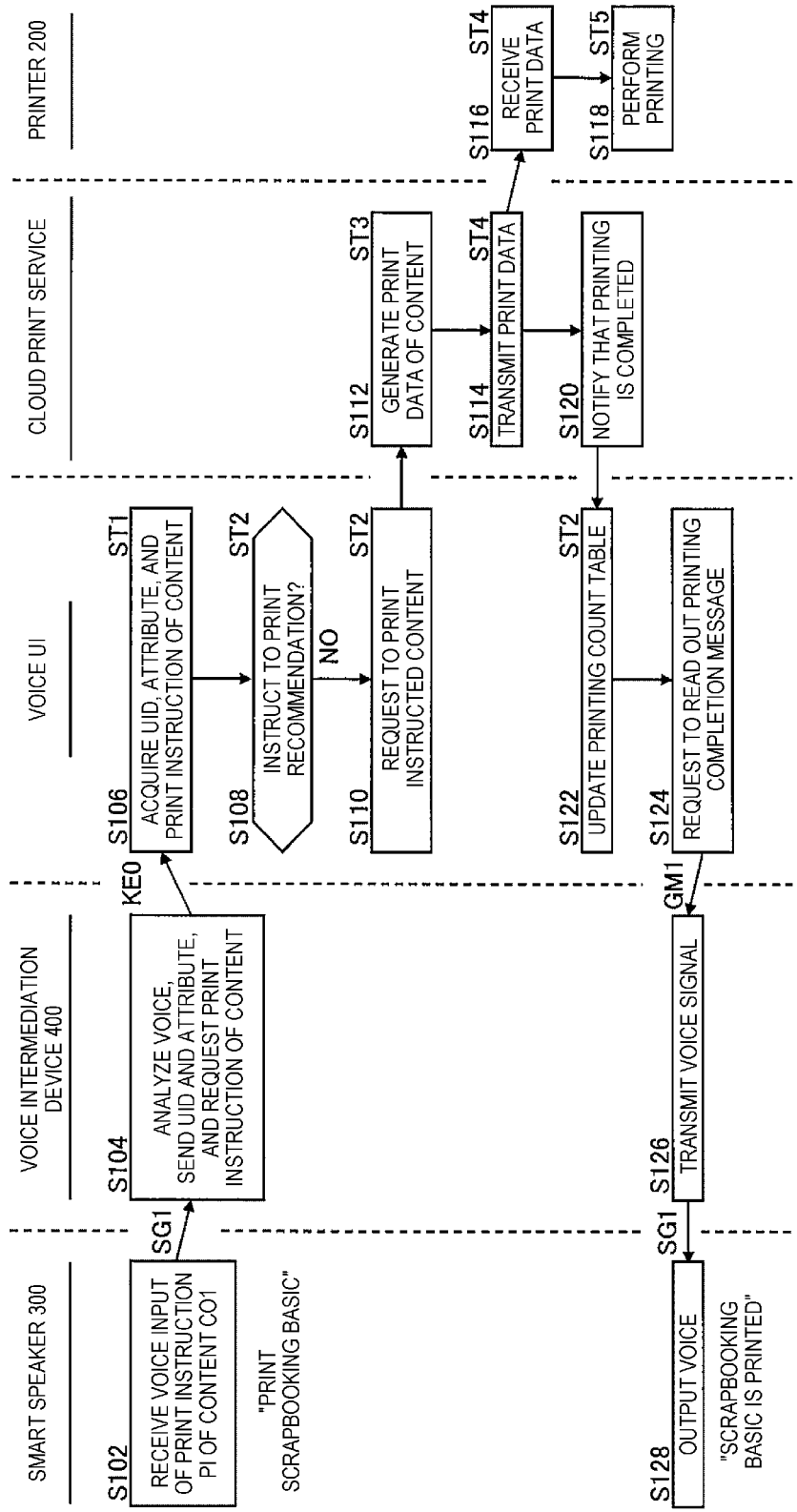
FIG. 8 is a diagram schematically showing an example of a process of printing a specific content according to a voice input.

FIG. 8 schematically shows a process of printing a specific content CO1 according to a voice input. As described above, the "voice UI" refers to a portion of the server 100 that has the function of the voice UI, and the "cloud print service" refers to a portion of the server 100 that has the function of the cloud print service. Here, step S106 corresponds to the print instruction acquisition step ST1, the print instruction acquisition unit 111, and the print instruction acquisition function FU1. Steps S108 to S110 and step S122 correspond to the selection step ST2, the selection unit 112, and the selection function FU2. Step S112 corresponds to the print data generation step ST3. Steps S114 to S116 correspond to the print data transmission step ST4. Steps S112 to S114 are performed by the transmission unit 121 and correspond to the transmission function FU3. S118 corresponds to the printing step ST5. Hereinafter, the description of a "step" is omitted, and reference signs of steps are shown in parentheses.

When a user US0 utters the print instruction PI of a specific content CO1 toward the smart speaker 300, the smart speaker 300 converts the voice from the user US0 into a voice signal SG1 and transmits the voice signal SG1 to the voice intermediation device 400 (S102). For example, when the user US0 utters "print scrapbooking basic", the basic content CO11 of scrapbooking included in the content group G1 as shown in FIG. 4 is a target of the print instruction PI.

The voice intermediation device 400 that received the voice signal SG1 acquires user identification information UID for identifying the user US0, and acquires an attribute AT associated with the user identification information UID. The voice intermediation device 400 analyzes the voice based on the voice signal SG1, extracts a keyword KE0 from an analysis result of the voice, sends the user identification information UID, the attribute AT, and the keyword KE0 to the voice UI, and requests the print instruction PI (S104). The keyword KE0 is included in the print instruction PI indicated by a voice. The print instruction PI may include a keyword KE0 for specifying the printer 200.

The voice intermediation device 400 stores the user identification information UID for each user US0 in a storage device, and stores the smart speaker identification information 300id in association with the user identification information UID. Therefore, when the smart speaker 300 transmits the smart speaker identification information 300id, the voice intermediation device 400 can acquire the user identification information UID associated with the smart speaker identification information 300id.

The voice intermediation device 400 stores information indicating a voice feature for each user US0 in the storage device in association with the user identification information UID. The voice feature for identifying the user US0 can be represented by, for example, a voice frequency distribution. Therefore, the voice intermediation device 400 may obtain the voice frequency distribution based on the voice signal SG1 and acquire the user identification information UID associated with a frequency distribution closest to the obtained frequency distribution from the storage device.

Further, the smart speaker 300 may receive a voice input of a name of the user US0, and the voice intermediation device 400 may extract the name of the user US0 based on the voice signal SG1 to acquire the user identification information UID associated with the name from the storage device.

FIG. 9 schematically shows a structure of an attribute table TA2 stored in a storage device by the voice intermediation device 400. The attribute table TA2 stores an attribute AT associated with the user identification information UID. FIG. 9 shows that "male in thirties" serving as the attribute AT is associated with "UID-001" serving as the user identification information UID, "female in thirties" serving as the attribute AT is associated with "UID-002" serving as the user identification information UID, "male under ten years old" serving as the attribute AT is associated with "UID-003" serving as the user identification information UID, and "female under ten years old" serving as the attribute AT is associated with "UID-004" serving as the user identification information UID.

The voice intermediation device 400 shown in FIG. 1 receives an input of gender and age of the user US0 via the terminal 500 or the smart speaker 300, acquires the gender and the age of the user US0 together with the user identification information UID, and stores the gender and the age in the attribute table TA2 in association with the user identification information UID. The voice intermediation device 400 acquires the attribute AT associated with the user identification information UID by referring to the attribute table TA2 when the voice intermediation device 400 receives a voice input of the print instruction PI. The acquired attribute AT is an attribute applicable to the user US0 who uttered the print instruction PI.

The voice UI acquires the print instruction PI including the keyword KE0, that is, the print instruction PI of the specific content CO1 included in the content group G1, from the voice intermediation device 400 together with the user identification information UID and the attribute AT (S106). In this manner, the print instruction acquisition unit 111 acquires an attribute AT applicable to the user US0 who uttered the voice from a plurality of classified user attributes UAT.

The attribute table TA2 may be stored in the storage device 104 of the server 100. In this case, the voice intermediation device 400 does not need to send the attribute AT to the voice UI, and the voice UI can acquire, from the attribute table TA2, the attribute AT associated with the user identification information UID acquired from the voice intermediation device 400.

When the selection unit 112 of the voice UI totalizes the printing count N1 for all users US0 regardless of the user attributes UAT, the voice intermediation device 400 does not need to send the attribute AT to the voice UI, and the voice UI does not need to acquire the attribute AT from the voice intermediation device 400.

After the print instruction PI is acquired, the voice UI determines whether the print instruction PI is an instruction to print a recommendation (S108), and when the print instruction PI is not an instruction to print a recommendation, the process proceeds to S110. The instruction to print a recommendation refers to an instruction to print a content CO1 without specifying the content CO1 from the plurality of contents CO1, for example, the print instruction PI is simply "scrapbooking" rather than "scrapbooking basic", and is a print instruction PI such as "print recommended scrapbooking" as shown in FIG. 10. A process in a case in which the print instruction PI is an instruction to print a recommendation will be described later.

When the print instruction PI is not an instruction to print a recommendation, the voice UI selects an instructed content CO1 from the content group G1, and requests the cloud print service to print the selected content CO1 (S110). Then, the cloud print service generates the print data DA1 using the content CO1 requested from the voice UI (S112). The print data DA1 is data for causing the printer 200 to print the requested content CO1. After the print data DA1 is generated, the cloud print service transmits the print data DA1 to the printer 200 associated with the user identification information UID via the network NE1 (S114).

In this manner, the transmission unit 121 of the server 100 transmits the print data DA1 for printing the selected content CO1 to the printer 200.

The printer 200 receives the print data DA1 via the network NE1 (S116), and performs printing according to the print data DA1 (S118). Accordingly, the content CO1 uttered by the user US0 is printed.

The cloud print service that transmitted the print data DA1 notifies the voice UI that the printing of the instructed content CO1 is completed (S120). The voice UI that received the notification of the completion of the printing updates the printing count N1 and the total printing count N0 that are stored in one of the printing count tables TA1 shown in FIGS. 4A to 4C for the instructed content CO1 (S122). When the attribute AT applicable to the user US0 is acquired in S106, the voice UI updates the printing count N1 and the total printing count N0 that are stored in one of the printing count tables TA1 shown in FIGS. 4A to 4C for the acquired attribute AT. For example, when the printing count N1 is classified according to gender as in the printing count table TA11 shown in FIG. 4A, the selection unit 112 of the voice UI increases the printing count N1 of the content CO1 to be printed by 1 and increases the total printing count N0 by 1 for the acquired attribute AT. When the user US0 who is a male utters "print scrapbooking basic", the selection unit 112 increases the printing count N1 of male of basic by 1 and increases the total printing count N0 of male by 1 in the printing count table TA11. In this manner, the printing count N1 of each content CO1 included in the content group G1 is classified according to a plurality of user attributes UAT and is totalized for a plurality of users US0. In a case in which the printing count N1 is totalized for all users US0, the selection unit 112 increases the printing count N1 of basic by 1 and increases the total printing count N0 by 1 for all users. In this manner, the printing count N1 of each content CO1 included in the content group G1 is totalized for all of a plurality of users US0.

After the printing count table TA1 is updated, the voice UI requests the voice intermediation device 400 to read out a printing completion message such as "is printed" together with a name of the corresponding content CO1 as a guidance message GM1 (S124). The voice intermediation device 400 that received the guidance message GM1 converts the guidance message GM1 into a voice signal SG1, and transmits the voice signal SG1 to the smart speaker 300 via the network NE1 (S126). The smart speaker 300 that received the voice signal SG1 converts the voice signal SG1 into a voice and outputs the voice (S128). Accordingly, the user US0 can hear a voice indicating that the content CO1 is printed. For example, in a case in which the content CO1 is scrapbooking basic, the smart speaker 300 outputs a voice such as "scrapbooking basic is printed".

FIG. 10 schematically shows a process of printing a recommended content CO1 according to a voice input. The print instruction PI shown in FIG. 10 is a print instruction including a selection instruction SI for causing the selection unit 112 to select a content CO1 based on the printing count N1. When an attribute AT applicable to the user US0 is considered, the print instruction PI is a print instruction including a selection instruction SI for causing the selection unit 112 to select a content CO1 based on the attribute AT.

The process shown in FIG. 10 is different from the process shown in FIG. 8 in that S110 is replaced with S142 to S144. Here, S142 to S144 correspond to the selection step ST2, the selection unit 112, and the selection function FU2.

When the user US0 utters a print instruction PI of a recommended content CO1 toward the smart speaker 300, the smart speaker 300 converts the voice from the user US0 into a voice signal SG1 and transmits the voice signal SG1 to the voice intermediation device 400 (S102). For example, when the user US0 utters "print recommended scrapbooking", a plurality of contents CO1 of scrapbooking included in the content group G1 are targets of the print instruction PI. The voice intermediation device 400 that received the voice signal SG1 acquires user identification information UID for identifying the user US0, and acquires an attribute AT associated with the user identification information UID. The voice intermediation device 400 analyzes the voice based on the voice signal SG1, extracts a keyword KE0 from an analysis result of the voice, sends the user identification information UID, the attribute AT, and the keyword KE0 to the voice UI, and requests the print instruction PI (S104).

The voice UI acquires the print instruction PI including the keyword KE0, that is, the print instruction PI including the selection instruction SI, from the voice intermediation device 400 together with the user identification information UID and the attribute AT (S106). When the attribute table TA2 as shown in FIG. 9 is stored in the storage device 104 of the server 100, the voice UI may acquire, from the attribute table TA2, the attribute AT associated with the user identification information UID acquired from the voice intermediation device 400. In addition, when the selection unit 112 of the voice UI totalizes the printing count N1 for all users US0 regardless of the user attributes UAT, the voice UI does not need to acquire the attribute AT from the voice intermediation device 400.

After the print instruction PI is acquired, the voice UI determines whether the print instruction PI is an instruction to print a recommendation (S108), and when the print instruction PI is an instruction to print a recommendation, the process proceeds to S142. In this case, the selection unit 112 of the voice UI selects a content CO1 to be printed from the content group G1 such that each content CO1 included in the content group G1 is randomly selected with a selection probability SR based on the printing count N1 (S142). When the attribute AT applicable to the user US0 is considered, the selection unit 112 selects a content CO1 to be printed from the content group G1 such that each content CO1 included in the content group G1 is selected with a selection probability SR based on the printing count N1 totalized for the acquired attribute AT. In this case, the selection unit 112 selects the content CO1 to be printed from the content group G1 based on the acquired attribute AT.

As shown in FIG. 5, when the printing count N1 is totalized for gender, the selection unit 112 selects the content CO1 to be printed for gender such that each content CO1 included in the content group G1 is selected with the selection probability SR of the ratio N1/N0 of the printing count N1 to the total printing count N0. Therefore, the selection unit 112 selects the content CO1 to be printed from the content group G1 based on the printing count N1 totalized for the acquired attribute AT among the plurality of user attributes UAT.

For example, it is assumed that the attribute AT applicable to the user US0 who uttered the print instruction PI of scrapbooking is male. In this case, the selection unit 112 selects the basic content CO11 shown in FIG. 3 with a selection probability SR of N1/N0=300/600, and selects the cute content CO13 shown in FIG. 3 with a selection probability SR of N1/N0=100/600. Therefore, when the user US0 is a male, the basic content CO11 is more likely to be selected than the cute content CO13. The difference in the selection probability SR between men is caused by a tendency preferred by a plurality of men serving as a plurality of users US0.

On the other hand, it is assumed that the attribute AT applicable to the user US0 who uttered the print instruction PI of scrapbooking is female. In this case, the selection unit 112 selects the basic content CO11 shown in FIG. 3 with a selection probability SR of N1/N0=100/750, and selects the cute content CO13 shown in FIG. 3 with a selection probability SR of N1/N0=400/750. Therefore, when the user US0 is a female, the cute content CO13 is more likely to be selected than the basic content CO11. The difference in the selection probability SR between women is different from the selection probability SR between men, and is caused by a tendency preferred by a plurality of women serving as a plurality of users US0.

As shown in FIG. 4B, when the printing count N1 of each content CO1 is classified according to an age range of the user US0, the selection unit 112 selects a content CO1 to be printed from the content group G1 such that the content CO1 is selected with a selection probability SR based on the printing count N1 totalized for an acquired age range among a plurality of age ranges. The difference in the selection probability SR among age ranges is caused by a difference in a preference tendency corresponding to age ranges.

As shown in FIG. 4C, when the printing count N1 of each content CO1 is classified according to gender and an age range of the user US0, the selection unit 112 selects a content CO1 to be printed from the content group G1 such that the content CO1 is selected with a selection probability SR based on the printing count N1 totalized for the acquired gender and age range among genders and a plurality of age ranges. The difference in the selection probability SR among genders and age ranges is caused by a difference in a preference tendency corresponding to genders and age ranges.

When the printing count N1 is totalized for all users US0, the selection unit 112 selects a content CO1 to be printed such that the content CO1 included in the content group G1 is selected with a selection probability SR of the ratio N1/N0 of the printing count N1 totalized for all users US0 to the total printing count N0. Therefore, the selection unit 112 selects a content CO1 to be printed from the content group G1 based on the totalized printing count N1. In the above case, the selection unit 112 selects the basic content CO11 shown in FIG. 3 with a selection probability SR of N1/N0=400/1350, and selects the cute content CO13 shown in FIG. 3 with a selection probability SR of N1/N0=500/1350. The difference in the selection probability SR is caused by a tendency preferred by all users US0.

After the content CO1 is selected based on the printing count N1, the voice UI requests the cloud print service to print the selected content CO1 (S144). Then, the cloud print service generates the print data DA1 using the content CO1 requested from the voice UI (S112), and transmits the print data DA1 to the printer 200 associated with the user identification information UID via the network NE1 (S114).

As described above, the transmission unit 121 of the server 100 transmits the print data DA1 for printing the selected content CO1 to the printer 200.

The printer 200 receives the print data DA1 via the network NE1 (S116), and performs printing according to the print data DA1 (S118). Accordingly, the content CO1 selected from the content group G1 based on the printing count N1 is printed.

The cloud print service that transmitted the print data DA1 notifies the voice UI that the printing of the selected content CO1 is completed (S120). The voice UI that received the notification of the completion of the printing updates the printing count N1 and the total printing count N0 that are stored in one of the printing count tables TA1 shown in FIGS. 4A to 4C for the selected content CO1 (S122). When the processes in S142 to S144 are performed, the voice UI may proceed to S124 without performing the process in S122, that is, without updating the printing count table TA1.

In S124, the voice UI requests the voice intermediation device 400 to read out a printing completion message such as "is printed" together with a name of the corresponding content CO1 as a guidance message GM1. The voice intermediation device 400 that received the guidance message GM1 converts the guidance message GM1 into a voice signal SG1 and transmits the voice signal SG1 to the smart speaker 300 (S126). The smart speaker 300 that received the voice signal SG1 converts the voice signal SG1 into a voice and outputs the voice (S128). Accordingly, the user US0 can hear a voice indicating that the content CO1 is printed. For example, in a case in which the content CO1 is scrapbooking basic, the smart speaker 300 outputs a voice such as "scrapbooking basic is printed".

As described above, when the content CO1 is printed according to the printing instruction PI indicated by a voice, the content CO1 is selected from the content group G1 based on the printing count N1 of the content CO1. When the printing count N1 is totalized for all users US0, the content CO1 is selected in consideration of a tendency preferred by all users US0. In a case in which the printing count N1 is totalized by being classified according to a plurality of user attributes UAT, the content CO1 is selected in consideration of a tendency preferred by a plurality of users US0 having the attribute AT applicable to the user US0 who uttered the print instruction PI. Therefore, the printing system SY1 has good usability.

(4) MODIFICATION

Various modifications are conceivable for the present disclosure.

The voice input and output device to which the present technique can be applied is not limited to the smart speaker 300, and may be a terminal such as a smartphone or a tablet, a personal computer, or the like.

The selection of the content CO1 based on the printing count N1 is not limited to a random selection with the selection probability SR based on the printing count N1 of the content CO1. For example, a content having a largest printing count N1 among the plurality of contents CO1 included in the content group G1 may be selected from the content group G1.

FIG. 11 schematically shows an example in which a content CO1 to be printed is not randomly selected and a content CO1 having a largest printing count N1 is selected, as another example of a process of printing a recommended content CO1 according to a voice input. The process shown in FIG. 11 is also a process of totalizing the printing count N1 for all users US0 regardless of the user attributes UAT.

The process shown in FIG. 11 is different from the process shown in FIG. 10 in that S104 is replaced with S162, S106 is replaced with S164, and S142 is replaced with S166. Here, S164 corresponds to the print instruction acquisition step ST1, the print instruction acquisition unit 111, and the print instruction acquisition function FU1. S166 corresponds to the selection step ST2, the selection unit 112, and the selection function FU2.

When a user US0 utters a print instruction PI of a recommended content CO1 toward the smart speaker 300, the smart speaker 300 converts the voice from the user US0 into a voice signal SG1 and transmits the voice signal SG1 to the voice intermediation device 400 (S102). The voice intermediation device 400 acquires user identification information UID for identifying the user US0, analyzes the voice based on the voice signal SG1, extracts a keyword KE0 from the analysis result of the voice, sends the user identification information UID and the keyword KE0 to the voice UI, and requests the print instruction PI (S162). The voice UI acquires the print instruction PI including the keyword KE0 from the voice intermediation device 400 together with the user identification information UID (S164).

The voice UI determines whether the print instruction PI is an instruction to print a recommendation (S108), and when the print instruction PI is an instruction to print a recommendation, the process proceeds to S166. In this case, the selection unit 112 of the voice UI selects a content CO1 having a largest printing count N1 from the content group G1 as a printing target (S166), and requests the cloud print service to print the selected content CO1 (S144). Then, the cloud print service generates the print data DA1 using the content CO1 requested from the voice UI (S112), and transmits the print data DA1 to the printer 200 associated with the user identification information UID via the network NE1 (S114). The printer 200 receives the print data DA1 via the network NE1 (S116), and performs printing according to the print data DA1 (S118). Accordingly, a content having a largest printing count N1 among the plurality of contents CO1 included in the content group G1 is printed.

A voice indicating that the selected content CO1 is printed is output from the smart speaker 300 through the processes in S120 to S128. The process in S122 may not be performed.

In the process as shown in FIG. 11, when a content CO1 is printed according to the printing instruction PI indicated by a voice, the content CO1 is also selected from the content group G1 based on the printing count N1 of the content CO1. At this time, since the content CO1 is selected in consideration of a tendency preferred by all users US0, the printing system SY1 that performs the process shown in FIG. 11 also has good usability.

The voice intermediation device 400 may send the attribute AT to the voice UI in S162, the voice UI may acquire the attribute AT from the voice intermediation device 400 in S164, and the content CO1 that has a largest printing count N1 totalized for the attribute AT acquired by the voice UI may be selected from the content group G1 in S166. In this case, the content CO1 is selected in consideration of a tendency preferred by a plurality of users US0 having the attribute AT applicable to the user US0 who uttered the print instruction PI.

As shown in FIG. 12, the content CO1 may be prepared according to the user attribute UAT. FIG. 12 schematically shows another example of the content group G1 stored in the content storage unit 113. In FIG. 12, for example, "U10M1", "U10M2", and the like serving as the content CO1 are associated "male under ten years old" serving as the user attribute UAT, and "U10F1", "U10F2", and the like serving as the content CO1 are associated with "female under ten years old" serving as the user attribute UAT.

The content CO1 may include a content common to different user attributes UAT. The number of contents CO1 associated with each user attribute UAT may be one.

The server 100 including the content storage unit 113 shown in FIG. 12 may select a content CO1 to be printed from one or more contents CO1 associated with an attribute AT applicable to a user US0 among a plurality of user attributes UAT in the content group G1. An example of such a process is shown in FIG. 13.

FIG. 13 schematically shows an example of a process of selecting a content CO1 to be printed from the content group G1 based on an attribute AT applicable to a user US0, as another example of a process of printing a content CO1 according to a voice input. Compared with the process shown in FIG. 10, the process shown in FIG. 13 does not include S108 and S122, and S142 to S144 are replaced with S202 to S204. Here, S202 to S204 correspond to the selection step ST2, the selection unit 112, and the selection function FU2.

When a user US0 utters a print instruction PI of a content CO1 toward the smart speaker 300, the smart speaker 300 converts the voice from the user US0 into a voice signal SG1 and transmits the voice signal SG1 to the voice intermediation device 400 (S102). The voice intermediation device 400 acquires user identification information UID for identifying the user US0, and acquires an attribute AT associated with the user identification information UID. The voice intermediation device 400 analyzes the voice based on the voice signal SG1, extracts a keyword KE0 from an analysis result of the voice, sends the user identification information UID, the attribute AT, and the keyword KE0 to the voice UI, and requests the print instruction PI (S104). The voice UI acquires the print instruction PI including the keyword KE0 from the voice intermediation device 400 together with the user identification information UID and the attribute AT (S106). When the attribute table TA2 as shown in FIG. 9 is stored in the storage device 104 of the server 100, the voice UI may acquire, from the attribute table TA2, the attribute AT that is associated with the user identification information UID acquired from the voice intermediation device 400.

After the print instruction PI is acquired, the selection unit 112 of the voice UI selects a content CO1 to be printed from one or more contents CO1 associated with the attribute AT applicable to the user US0 among a plurality of user attributes UAT in the content group G1 (S202). In this case, the selection unit 112 selects the content CO1 to be printed from the content group G1 based on the acquired attribute AT. When a plurality of contents CO1 are associated with the attribute AT applicable to the user US0, the selection unit 112 may select a content CO1 to be printed from the plurality of contents CO1 based on the printing count N1 totalized for the attribute AT applicable to the user US0, or may randomly select a content CO1 from the plurality of contents CO1 regardless of the printing count N1.

For example, when the user US0 who uttered the print instruction PI is a male under ten years old, the attribute AT acquired in S106 is "male under ten years old". In this case, the selection unit 112 selects one content CO1 from the contents CO1 such as "U10M1" and "U10M2" included in the content group G1 shown in FIG. 12. When the user US0 who uttered the print instruction PI is a female in twenties, the attribute AT acquired in S106 is "female in twenties". In this case, the selection unit 112 selects one content CO1 from the contents CO1 such as "20F1" and "20F2" included in the content group G1 shown in FIG. 12.

After the content CO1 is selected, the voice UI requests the cloud print service to print the selected content CO1 (S204). Then, the cloud print service generates the print data DA1 using the content CO1 requested from the voice UI (S112), and transmits the print data DA1 to the printer 200 associated with the user identification information UID via the network NE1 (S114). The printer 200 receives the print data DA1 via the network NE1 (S116), and performs printing according to the print data DA1 (S118). Accordingly, the content CO1 selected from the content group G1 based on the attribute AT applicable to the user US0 is printed.

A voice indicating that the selected content CO1 is printed is output from the smart speaker 300 through the processes in S120, and S124 to S128. When the content CO1 is selected based on the printing count N1 totalized for the attribute AT applicable to the user US0 in S202, the voice UI may perform a printing count table update process in S122 as shown in FIG. 10.

As described above, a content CO1 is selected from the content group G1 based on the attribute AT of the user US0 who utters the print instruction PI when the content CO1 is printed according to the print instruction PI indicated by a voice. Accordingly, the attribute of the user US0 is considered for the content CO1 to be printed. Therefore, the printing system SY1 has good usability.

FIG. 14 schematically shows an example of a process of printing a recommended content CO1 according to a voice input, as an example of a process of selecting a content CO1 to be printed from the content group G1 based on an attribute AT applicable to a user US0. The print instruction PI shown in FIG. 14 is a print instruction including a selection instruction SI for causing the selection unit 112 to select a content CO1 based on an attribute AT.

The process shown in FIG. 14 is different from the process shown in FIG. 13 in that S108 is added between S106 and S202.

When a user US0 utters a print instruction PI of a recommended content CO1 toward the smart speaker 300, the smart speaker 300 converts the voice from the user US0 into a voice signal SG1 and transmits the voice signal SG1 to the voice intermediation device 400 (S102). For example, when the user US0 utters "print recommended scrapbooking", a plurality of contents CO1 of scrapbooking included in the content group G1 are targets of the print instruction PI. The voice intermediation device 400 that received the voice signal SG1 acquires user identification information UID for identifying the user US0, and acquires an attribute AT associated with the user identification information UID. The voice intermediation device 400 analyzes the voice based on the voice signal SG1, extracts a keyword KE0 from an analysis result of the voice, sends the user identification information UID, the attribute AT, and the keyword KE0 to the voice UI, and requests the print instruction PI (S104).

The voice UI acquires the print instruction PI including the keyword KE0, that is, the print instruction PI including the selection instruction SI, from the voice intermediation device 400 together with the user identification information UID and the attribute AT (S106). When the attribute table TA2 as shown in FIG. 9 is stored in the storage device 104 of the server 100, the voice UI may acquire, from the attribute table TA2, the attribute AT that is associated with the user identification information UID acquired from the voice intermediation device 400.

After the print instruction PI is acquired, the voice UI determines whether the print instruction PI is an instruction to print a recommendation (S108), and when the print instruction PI is an instruction to print a recommendation, the process proceeds to S202. In this case, the selection unit 112 of the voice UI selects a content CO1 to be printed from one or more contents CO1 associated with the attribute AT applicable to the user US0 among a plurality of user attributes UAT in the content group G1 (S202). After that, the selected content CO1 is printed through the processes in S204 and S112 to S118. A voice indicating that the selected content CO1 is printed is output from the smart speaker 300 through the processes in S120, and S124 to S128.

When it is determined in S108 that the print instruction PI is not an instruction to print a recommendation, the content CO1 specified by a voice input is printed.

As described above, the content CO1 is selected based on the attribute AT applicable to the user US0 according to the print instruction PI including the selection instruction SI for selecting the content CO1 based on the attribute AT. Therefore, in the example shown in FIG. 14, it is possible to further improve usability.

(5) CONCLUSION

As described above, according to the present disclosure, it is possible to provide a technique of the printing system SY1, the server 100, and the like that improve usability in various aspects. As a matter of course, the above-described basic functions and effects can also be attained with a technique including only constituent requirements according to independent claims.

It is also possible to implement a configuration in which components disclosed in the above-described examples are replaced with one another or a combination of the components is changed, a configuration in which components disclosed in a known technique and examples described above are replaced with one another or a combination of the components is changed, and the like. The present disclosure also includes such configurations and the like.

What is claimed is:
1. A printing system, comprising:
a printing device; and
a server coupled to the printing device via a network, wherein
the server includes
a print instruction acquisition unit configured to:
acquire, from a voice intermediation device, a print instruction indicated by a voice that is a print instruction of a content included in a content group, and
acquire, from a plurality of classified user attributes, an attribute applicable to a user who uttered the voice,
a selection unit configured to select a content to be printed from the content group according to the print instruction, and
a transmitter configured to transmit print data for printing the selected content to the printing device,
the selection unit is further configured to:
classify a printing count of each content included in the content group corresponding to the plurality of classified user attributes,
totalize the printing count for each content included in the content group, and
select the content to be printed from the content group based on the totalized printing count for the acquired attribute among the plurality of classified user attributes,
the totalized printing count represents a number of times each content included in the content group is printed by a plurality of users, and
the printing device receives the print data and performs printing according to the print data.

2. The printing system according to claim 1, wherein
the print instruction includes a selection instruction for causing the selection unit to select the content based on the printing count, and
when the print instruction acquisition unit acquires the print instruction including the selection instruction, the selection unit is further configured to select the content to be printed from the content group based on the printing count totalized for the plurality of users.

3. The printing system according to claim 1, wherein
the selection unit is further configured to select the content to be printed from the content group such that each content included in the content group is selected with a probability based on the printing count.

4. The printing system according to claim 3, wherein the probability of selecting each content included in the content group is a ratio of the printing count of each content to a total printing count of a plurality of contents included in the content group.

5. The printing system according to claim 1, wherein the selection unit is further configured to select the content to be printed from the content group such that each content included in the content group is selected with a probability based on the totalized printing count for the acquired attribute among the plurality of classified user attributes.

6. The printing system according to claim 5, wherein the probability of selecting each content included in the content group is a ratio of the printing count of each content to a total printing count of a plurality of contents included in the content group when the printing count is totalized for the acquired attribute among the plurality of classified user attributes.

7. A printing system, comprising:
a printing device; and
a server coupled to the printing device via a network, wherein
the server includes
a print instruction acquisition unit configured to acquire, from a voice intermediation device, a print instruction indicated by a voice of a user that is a print instruction of a content included in a content group,
a selection unit configured to select a content to be printed from the content group according to the print instruction, and
a transmitter configured to transmit print data for printing the selected content to the printing device,
the print instruction acquisition unit acquires an attribute applicable to the user from a plurality of classified user attributes,
the selection unit selects the content to be printed from the content group based on the acquired attribute,
the selection unit classifies the printing count of each content included in the content group corresponding to the plurality of classified user attributes, totalizes the printing count for a plurality of users, and selects the content to be printed from the content group based on the printing count totalized for the acquired attribute among the plurality of classified user attributes, and
the printing device receives the print data and performs printing according to the print data.

8. The printing system according to claim 7, wherein
the print instruction includes a selection instruction for causing the selection unit to select the content based on the attribute, and
when the print instruction acquisition unit acquires the print instruction including the selection instruction, the selection unit selects the content to be printed from the content group based on the attribute applicable to the user among the plurality of classified user attributes.

9. The printing system according to claim 1, wherein the attribute is at least one of a gender and an age.

10. The printing system according to claim 1, wherein the print instruction acquisition unit is further configured to acquire the attribute applicable to the user from the voice intermediation device.

11. The printing system according to claim 1, wherein the server further includes a content storage that stores the content group.

12. A server coupled via a network to a printing device that performs printing according to received print data, the server comprising:
a print instruction acquisition unit configured to:
acquire, from a voice intermediation device, a print instruction indicated by a voice that is a print instruction of a content included in a content group, and
acquire, from a plurality of classified user attributes, an attribute applicable to a user who uttered the voice;
a selection unit configured to select a content to be printed from the content group according to the print instruction; and
a transmitter configured to transmit the print data for printing the selected content to the printing device, wherein
the selection unit is further configured to:
classify a printing count of each content included in the content group corresponding to the plurality of classified user attributes,
totalize the printing count for each content included in the content group, and
select the content to be printed from the content group based on the totalized printing count for the acquired attribute among the plurality of classified user attributes, and
the totalized printing count represents a number of times each content included in the content group is printed by all of a plurality of users.

13. A server coupled via a network to a printing device that performs printing according to received print data, the server comprising:
a print instruction acquisition unit configured to acquire, from a voice intermediation device, a print instruction indicated by a voice of a user that is a print instruction of a content included in a content group;
a selection unit configured to select a content to be printed from the content group according to the print instruction; and
a transmitter configured to transmit print data for printing the selected content to the printing device, wherein
the print instruction acquisition unit acquires an attribute applicable to the user from a plurality of classified user attributes,
the selection unit selects the content to be printed from the content group based on the acquired attribute, and
the selection unit classifies the printing count of each content included in the content group corresponding to the plurality of classified user attributes, totalizes the printing count for a plurality of users, and selects the content to be printed from the content group based on the printing count totalized for the acquired attribute among the plurality of classified user attributes.

* * * * *